United States Patent
Sato et al.

(10) Patent No.: US 8,050,535 B2
(45) Date of Patent: Nov. 1, 2011

(54) COMPUTER READABLE STORAGE MEDIUM STORING VIDEO CONTENTS DISPLAY PROGRAM AND VIDEO CONTENTS DISPLAY APPARATUS

(75) Inventors: Noriyuki Sato, Kyoto (JP); Masahiro Kawano, Kyoto (JP); Eisaku Nakae, Kyoto (JP); Sachiko Ikeo, Kyoto (JP); Takumi Hatakeyama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1230 days.

(21) Appl. No.: 11/785,650

(22) Filed: Apr. 19, 2007

(65) Prior Publication Data
US 2008/0212938 A1   Sep. 4, 2008

(30) Foreign Application Priority Data
Mar. 1, 2007   (JP) ................................. 2007-051859

(51) Int. Cl.
*H04N 9/80* (2006.01)
*H04N 9/82* (2006.01)
*H04N 9/92* (2006.01)
*G09G 5/00* (2006.01)

(52) U.S. Cl. ........ 386/248; 386/240; 386/246; 386/245; 386/239; 345/625; 345/619; 345/419

(58) Field of Classification Search .................. 386/239, 386/240, 246; 345/419, 619, 62
See application file for complete search history.

(56) References Cited

U.S. PATENT DOCUMENTS

| | | | |
|---|---|---|---|
| 6,654,031 B1 * | 11/2003 | Ito et al. ......................... | 715/723 |
| 2006/0012675 A1 * | 1/2006 | Alpaslan et al. ................ | 348/51 |
| 2006/0139314 A1 * | 6/2006 | Bell ............................. | 345/156 |
| 2011/0018867 A1 * | 1/2011 | Shibamiya et al. ........... | 345/419 |

FOREIGN PATENT DOCUMENTS
JP   2007-13561   1/2007

* cited by examiner

*Primary Examiner* — Helen Shibru
(74) *Attorney, Agent, or Firm* — Nixon & Vanderhye P.C.

(57) ABSTRACT

A contents display control means displays video contents in a contents display screen area, a virtual space display control means displays a two-dimensional or a three-dimensional virtual space and an object appearing in the two-dimensional or the three-dimensional virtual space in a virtual space display screen area, and a motion control means controls, when the video contents is displayed in the contents display screen area, a motion of the object, with reference to additional information of the video contents and motion control information specifying the motion of the object when the additional information satisfies a certain condition. Accordingly, a novel video contents display method can be provided with the use of the additional information multiplexed into the video contents.

16 Claims, 22 Drawing Sheets

F I G. 1 4

| SELECTION TABLE ||
|---|---|
| CURRENT SITUATION | DETERMINING OBJECT MOTION TABLE |
| SLEEPING | MOTION CONTROL TABLE C |
| EATING | MOTION CONTROL TABLE A |
| ⋮ | ⋮ |

F I G. 1 5

| MOTION CONTROL TABLE A (PROGRAM TITLE/PROGRAM CONTENT/SUBTITLES) |||
|---|---|---|
| KEYWORD | MOTION CONTENT | EXECUTION TIME |
| FOOTBALL | OBJECTS KICK FOOTBALL TO ONE ANOTHER | 30 |
| BASEBALL | OBJECTS PLAY BASEBALL TOGETHER | 30 |
| NEWS | SIT BEFORE TELEVISION | 25 |
| COOKING | COOK A MEAL | 20 |
| COOKING | HAVE A MEAL | 20 |
| ⋮ | ⋮ | ⋮ |

FIG. 16

| MOTION CONTROL TABLE B (DATE) | | |
|---|---|---|
| DATE | MOTION CONTENT | EXECUTION TIME |
| DEC. 24 | HAVE A CHRISTMAS PARTY | 50 |
| JAN. 1 | VISIT SHRINE | 50 |
| JUNE | PUT UP UMBRELLA | 25 |
| ⋮ | ⋮ | ⋮ |

FIG. 17

| MOTION CONTROL TABLE C (PROGRAM/PROGRAM START TIME/PROGRAM END TIME) | | |
|---|---|---|
| TIME | MOTION CONTENT | EXECUTION TIME |
| 0:00 | SLEEPING | 1000 |
| 12:00 | HAVE A MEAL | 20 |
| ⋮ | ⋮ | ⋮ |

FIG. 18

| MOTION CONTROL TABLE D (GENRE [NUMBER INFORMATION]) | | | |
|---|---|---|---|
| MAIN GENRE | INTERMEDIATE GENRE | MOTION CONTENT | EXECUTION TIME |
| VARIETY | QUIZ | NOD | 50 |
| VARIETY | (IGNORE) | WAVE HANDS | 10 |
| VARIETY | GAME | PLAY VIDEO GAME | 25 |
| DRAMA | PERIOD DRAMA | CHANGE CLOTHES | 25 |
| (IGNORE) | MUSICAL | DANCE | 40 |
| ⋮ | ⋮ | ⋮ | ⋮ |

FIG. 19

| WORD BALLOON CONTROL TABLE | |
|---|---|
| TARGET INFORMATION | WORD BALLOON CONTENT |
| PROGRAM TITLE | "○○ IS POPULAR, ISN'T IT?" |
| PROGRAM TITLE | "○○ IS FUN, ISN'T IT?" |
| DATE | "○ IS MY FAVORITE MONTH." |
| TIME | "IT'S ALREADY ○ O'CLOCK." |
| ⋮ | ⋮ |

# COMPUTER READABLE STORAGE MEDIUM STORING VIDEO CONTENTS DISPLAY PROGRAM AND VIDEO CONTENTS DISPLAY APPARATUS

CROSS REFERENCE TO RELATED APPLICATION

The disclosure of Japanese Patent Application No. 2007-51859, filed Mar. 1, 2007, is incorporated herein by reference.

BACKGROUND OF THE INVENTION

1. Field of the Invention

The present invention relates to a computer readable storage medium storing a video contents display program, and a video contents display apparatus.

2. Description of the Background Art

Conventionally, as an example of a video contents display apparatus, there is a digital broadcast receiving apparatus for performing display based on data included in a broadcast signal which is transmitted from a broadcasting station and then received (see, for example, Japanese Patent Laid-Open Publication No. 2007-13561). Patent Document 1 describes a method of displaying subtitles data included in the broadcast signal, which is transmitted from the broadcasting station and then received, in conjunction with video data. The subtitles were originally developed for a hearing-impaired person, and as an alternative usage of the subtitles, the subtitles may be used for learning a foreign language or for enabling checking of a content of a broadcast program even when a sound is muffled.

However, the subtitles data has conventionally been used for only such purposes as displaying the subtitles data in conjunction with the video data so as to enable the hearing-impaired person to understand the content of a broadcast visually, learning the foreign language, and enabling a viewer to catch the content of the broadcast program even when the sound is muffled. The subtitles data has yet to be used in a further effective manner.

SUMMARY OF THE INVENTION

Therefore, an object of the present invention is to provide a novel video contents display method which utilizes additional information added to (for example, multiplexed into) the video contents (such as, for example, the subtitles data multiplexed into a digital broadcast signal, program information data, broadcasting station data, date data, and viewing age restriction data).

Further, another object of the present invention is to provide a method for presenting new information linked to the video contents by utilizing both of the video contents and the additional information relating thereto and by processing the data in an efficient manner based on the data structure.

The present invention has the following features to attain at least one of the objects mentioned above. Note that reference characters inside parentheses indicate examples of correspondence to drawings for the sake of easy understanding of the present invention, and do not restrict the present invention.

A computer readable storage medium of the present invention is a computer readable storage medium storing a video contents display program for displaying video contents. The video content shave additional information relating to the video contents added (for example, multiplexed) thereto. The video contents display program causes a computer (21) of a video contents display apparatus to execute a contents display control step (S55), a virtual space display control step (S112), and a motion control step (S110). The contents display control step is a step of displaying the video contents in a contents display screen area. The virtual space display control step is a step of displaying, in a virtual space display screen area, a two-dimensional or a three-dimensional virtual space and an object appearing in the two-dimensional or the three-dimensional virtual space. The motion control step is a step of controlling, when the video contents are displayed in the contents display screen area, a motion of the object such that the object moves in conjunction with the video contents, with reference to the additional information of the video contents and motion control information (52) which specifies the motion of the object when the additional information satisfies a predetermined condition.

In an embodiment of the present invention, in the motion control information, the motion of the object when a predetermined character string or a code is included in the additional information is specified.

In another embodiment of the present invention, to the video contents, a plurality of types of the additional information is added, the motion control information includes a plurality of motion control tables corresponding to various types of the additional information, and the motion control step includes a selecting step of selecting one of the plurality of motion control tables, and a determining step of determining the motion of the object with reference to the selected motion control table.

Further in another embodiment of the present invention, in the selecting step, one of the plurality of motion control tables is selected randomly when a predetermined condition is satisfied.

Further in another example of the present invention, in the selecting step, motion control tables are selected one by one from the plurality of motion control tables in accordance with a predetermined order when a predetermined condition is satisfied.

Further in another embodiment of the present invention, in the selecting step, with reference to a selection table which defines a correlation between a current situation of the object and the plurality of motion control tables, one of the plurality of motion control tables is selected in accordance with the current situation of the object.

Further in another embodiment of the present invention, the video contents includes broadcast contents, and in the motion control information, the motion of the object is specified in the case where at least one of subtitles information, program identification information, broadcasting station identification information, broadcast area identification information, broadcast time and data information, and viewing age restriction information, which are multiplexed into the broadcast contents, satisfies a predetermined condition.

Further in another embodiment of the present invention, the motion control step includes a step of generating text by combining a character string contained in the additional information and a character string previously prepared, and a step of displaying the generated text as a word balloon of the object.

Further in another embodiment of the present invention, the video contents display program further causes the computer to execute a step of counting elapsed time since the motion of the object has changed, and in the motion control step, the motion of the object is controlled such that, from a time when the motion of the object has changed, the object continues a single motion until a time when a predetermined execution time has passed.

Further in another embodiment of the present invention, in the motion control step, with reference to a motion control table which defines a correlation between the motion of the object and execution time, whether or not the predetermined execution time has passed since the motion of the object has changed is determined.

Further in another embodiment of the present invention, the contents display screen area is an area in a first screen, and the virtual space display screen area is a area in a second screen which is different from the first screen.

Further in another embodiment of the present invention, the additional information includes subtitles information, in the contents display control step, in accordance with the subtitle information, and in the motion control step, the subtitles are displayed in the contents display screen area in synchronicity with a video of the video contents, the motion of the object is controlled so as to move in conjunction with the subtitles displayed in the contents display screen area.

Further in another embodiment of the present invention, the additional information includes the subtitles information; the subtitles information includes information which represents timing of respective pieces of text to be displayed on a screen; the motion control information specifies the motion of the object corresponding to a keyword; and the motion control step includes a step of determining, with reference to the subtitles information and the motion control information, whether or not the keyword is included in, among the subtitles, subtitles corresponding to a scene currently displayed in the contents display screen area, and a step of causing the object to perform a motion corresponding to the keyword when the keyword is included in, among the subtitles, the subtitles corresponding to the scene.

A video contents display apparatus of the present invention, is a video contents display apparatus for displaying video contents. The video contents have additional information relating to the video contents added thereto. The video contents display apparatus includes a contents display control means, a virtual space display control means, and a motion control means. The contents display control means is a means for displaying the video contents in a contents display screen area. The virtual space display control means is a means for displaying, in a virtual space display screen area, a two-dimensional or a three-dimensional virtual space and an object appearing in the two-dimensional or the three-dimensional virtual space. The motion control means is a means for controlling, when the video contents are displayed in the contents display screen area, a motion of the object such that the object moves in conjunction with the video contents, with reference to the additional information of the video contents and motion control information which specifies the motion of the object when the additional information satisfies a predetermined condition.

According to the present invention, at the time of displaying the video contents, it is possible to display, in a virtual space, an object moving in conjunction with the additional information multiplexed into the video contents, thereby making it possible to provide a viewer of the video contents with new entertainment.

These and other objects, features, aspects and advantages of the present invention will become more apparent from the following contented content of the present invention when taken in conjunction with the accompanying drawings.

BRIEF DESCRIPTION OF THE DRAWINGS

FIG. 14 is a specific example of a selection table;

FIG. 15 is a specific example of a motion control table A;

FIG. 16 is a specific example of a motion control table B;

FIG. 17 is a specific example of a motion control table C;

FIG. 18 is a specific example of a motion control table D;

FIG. 19 is a specific example of a word balloon control table;

DESCRIPTION OF THE PREFERRED EMBODIMENTS

Hereinafter, embodiments of the present invention will be described.

Figure 1:
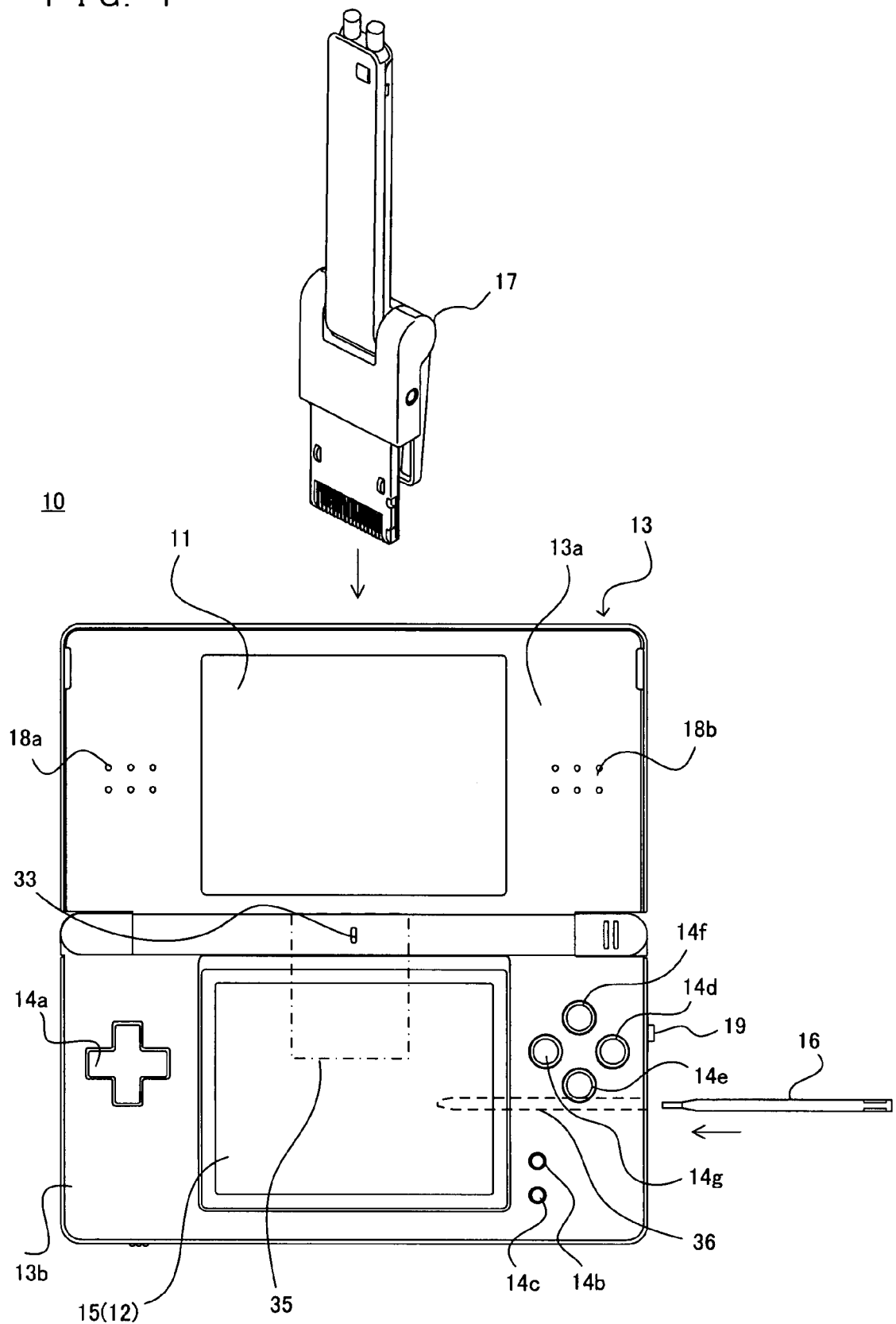
FIG. 1 is a view illustrating an outer appearance of a game apparatus according to one embodiment of the present invention.

FIG. 1 is a view illustrating an outer appearance of a game apparatus according to one embodiment of the present invention. The present invention is applicable not only to a hand-held game apparatus, but also to a non-hand held game apparatus. Further, the present invention is applicable not only to the game apparatus, but also to a given information processing apparatus having a video contents display function (e.g. a personal computer, a cellular phone, a television receiver, a DVD player, and the like).

In FIG. 1, a game apparatus 10 includes a fist LCD (liquid crystal display) 11 and a second LCD 12. A housing 13 is composed of an upper housing 13a and a lower housing 13b. The first LCD 11 is accommodated in the upper housing 13a, and the second LCD 12 is accommodated in the lower housing 13b. Each of the first LCD 11 and the second LCD 12 has a resolution of 256 dots×192 dots. Although in the present embodiment, an LCD is used as a display device, any other display device, for example, a display device using an EL (electro luminescence), can be used. Further, the resolutions of the first LDC 11 and the second LCD 12 may be arbitrarily chosen.

On the upper housing 13a, provided are sound holes 18a and 18b for outputting a sound from a pair of loudspeakers (30a and 30b shown in FIG. 3) described below. Further, on the hinge section which connects the upper housing 13a and the lower housing 13b in a foldable manner, a microphone hole 33 is provided.

on the lower housing 13b, provided as input devices are a cross switch 14a, a start switch 14b, a select switch 14c, an A button 14d, a B button 14e, an X button 14f, and a Y button 14g. On the side face of the lower housing 13b, provided are an L button, and an R button which are not shown in the drawing. Further, as an input device different from each of the control switches, the second LCD 12 has a touch panel 15 mounted on a screen thereof. On the side face of the lower housing 13b, provided are a power supply switch 19, a receptacle 35 (a single dotted and dashed line shown in FIG. 1) into which a digital broadcast receiving card 17 is inserted, and a receptacle 36 into which a stick 16 is accommodated. Although in the present invention, an example will be described in which the digital broadcast receiving card 17 is connected to the receptacle 35, a game cartridge is originally inserted into the receptacle 35, and then the game processing based on a game program stored in the game cartridge is executed by a game apparatus 10.

The touch panel 15 is of a resistive film type. Note that, in the present invention, not only the resistive film type, but also a given pressing type touch panel may be used. The touch panel 15 can be controlled not only with the stick 16, but also with a finger of a user. In the present embodiment, the touch panel 15 has a resolution (detection accuracy) of 256 dots× 192 dots, similar to the resolution of the second LCD 12. However, the touch panel 15 need not necessarily have the same resolution as the second LCD 12.

Figure 2:
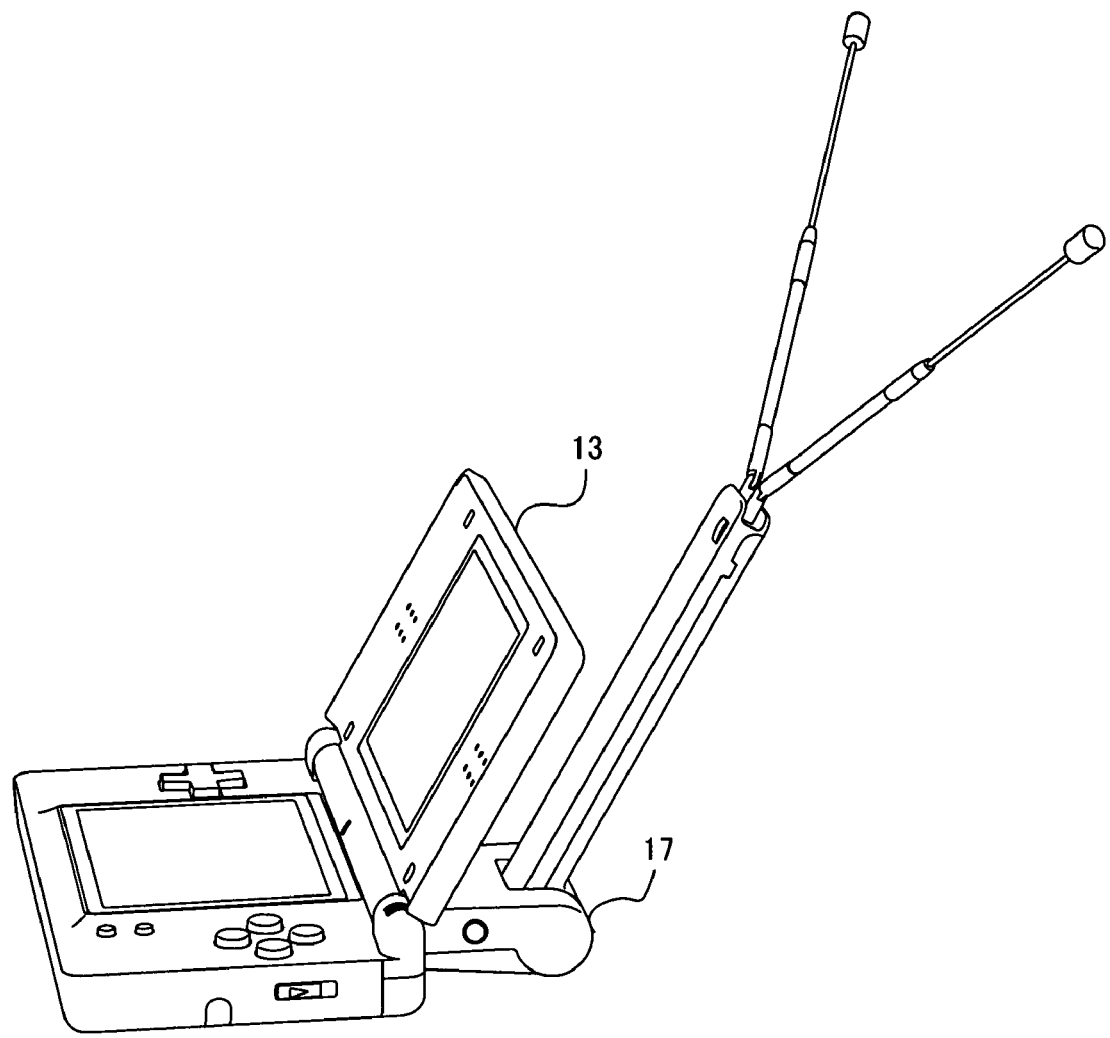
FIG. 2 is a perspective view of the game apparatus.

The broadcast receiving card 17 is a card having a digital broadcast receiving function, and is detachably inserted into the receptacle 35 provided in the lower housing 13b (see FIG. 2).

Figure 3:
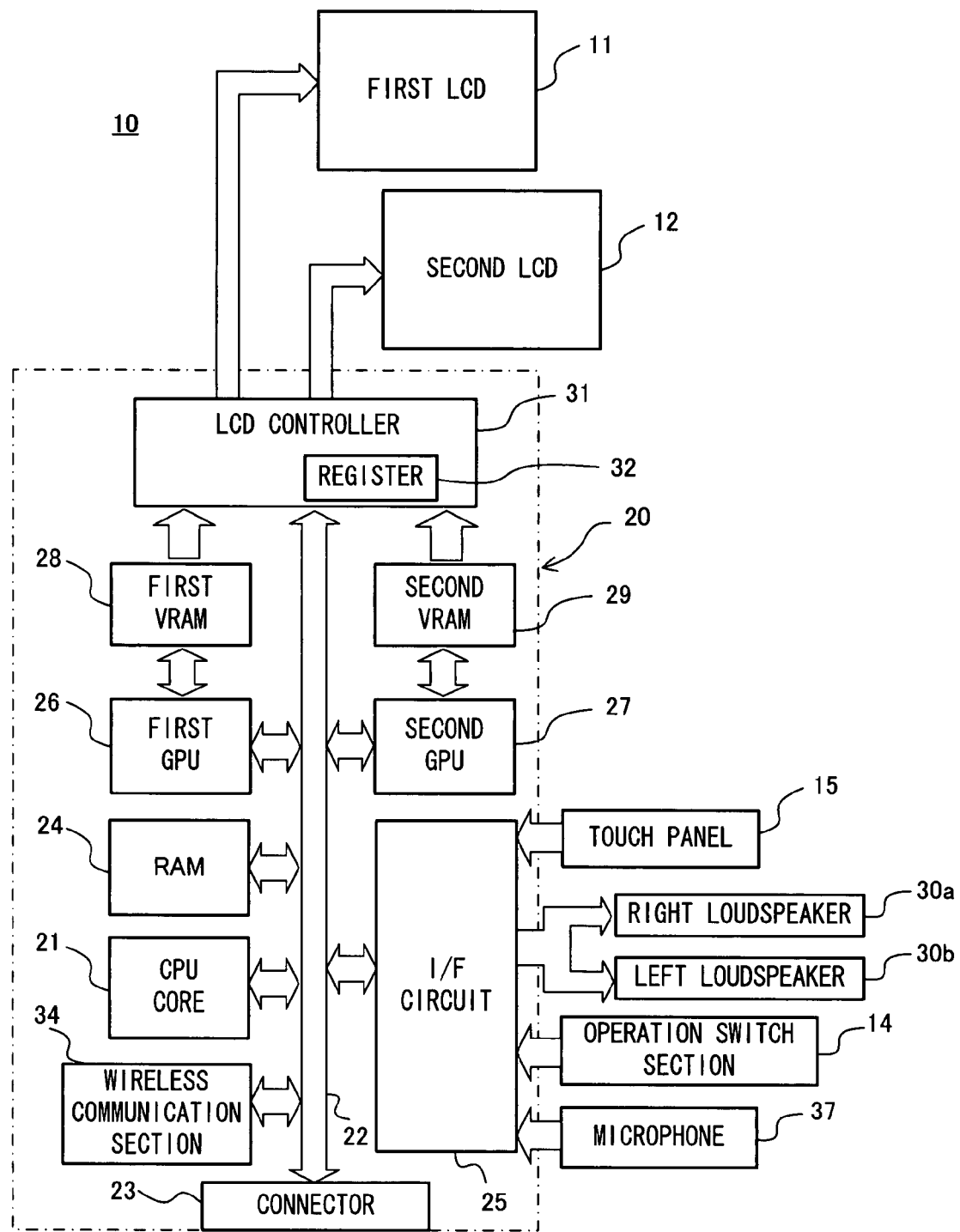
FIG. 3 is a block diagram illustrating an internal structure of the game apparatus.

Next, with reference to FIG. 3, an internal structure of the game apparatus 10 will be described. FIG. 3 is a block diagram illustrating an internal structure of the game apparatus. In FIG. 3, a CPU core 21 is mounted on the electronic circuit board 20 accommodated in the housing 13. Via a bus 22, the CPU core 21 is connected to a connector 23, an input/output interface circuit (denoted as an I/F circuit in the drawing) 25, a first GPU (graphics processing unit) 26, a second GPU 27, a RAM 24, an LCD controller 31, and a wireless communication section 34. The digital broadcast receiving card 17 is detachably connected to the connector 23. The touch panel 15, the right loudspeaker 30a, the left loudspeaker 30b, an operation switch section 14 including the cross switch 14a, the A button 14d and the like as shown in FIG. 1, and a microphone 37 are connected to the I/F circuit 25. The right loudspeaker 30a and the left loudspeaker 30b are placed inside the sound holes 18a and 18b, respectively. The microphone 37 is placed inside the microphone hole 33.

The first GPU 26 is connected to a first VRAM (a video-RAM) 28. The second GPU 27 is connected to a second VRAM 29. In accordance with an instruction from the CPU core 21, the first GPU 26 generates a first display image, and writes display image data into the first VRAM 28. Similarly, in accordance with an instruction from the CPU core 21, the second GPU 27 generates a second display image, and writes display image data into the second VRAM 29. The first VRAM 28 and the second VRAM 29 is connected to the LCD controller 31.

The LCD controller 31 includes a register 32. The register 32 stores a value "0" or "1" in accordance with an instruction from the CPU core 21. When the register 32 stores a value "0", the LCD controller 31 outputs, to the first LCD 11, the first display image which has been written into the first VRAM 28, and outputs, to the second LCD 12, the second display image which has been written into the second VRAM 29. On the other hand, when the register 32 stores a value "1", the LCD controller 31 outputs, to the second LCD 12, the first display image which has been written into the first VRAM 28, and outputs, to the first LCD 11, the second display image which has been written into the second VRAM 29.

The wireless communication section 34 has a function of exchanging data with a wireless communication section of another game apparatus. The game apparatus 10 may be connected to a wide-area network such as the Internet via the wireless communication section 34, or may communicate with another game apparatus via a network.

Next, the digital broadcast receiving card 17 will be described.

Figure 4:
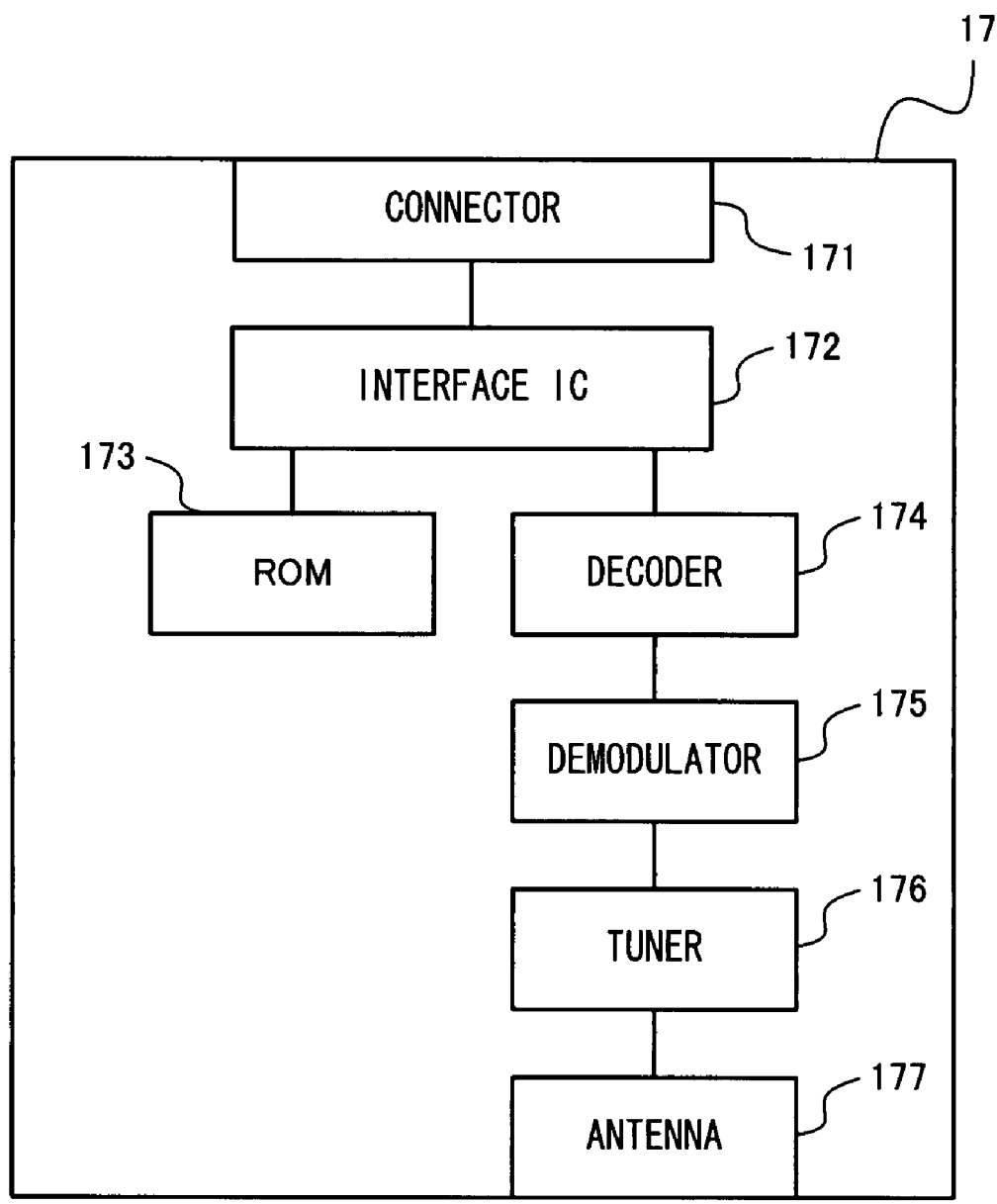
FIG. 4 is a block diagram illustrating an internal structure of a digital broadcast receiving card.

FIG. 4 is a block diagram illustrating an internal structure of a digital broadcast receiving card. The digital broadcast receiving card 17 includes a connector 171, an interface IC 172, a ROM 173, a decoder 174, a demodulator 175, a tuner 176, and an antenna 177. The connector 171 can be connected to the connector 23 as shown in FIG. 3. In accordance with a request from the CPU core 21, the interface IC 172 outputs data stored in the ROM 173 or data outputted from the decoder 174 to the connector 171. A video contents display program is stored in the ROM 173. When the power is turned ON with the power supply switch 19, while the digital broadcast receiving card 17 is being inserted into the receptacle 35, the video contents display program stored in the ROM 173 is loaded into the RAM 24, and then executed by the CPU core 21. The video contents display program is not limited to such that is provided by the digital broadcast receiving card 17 to the RAM 24, and may be provided from another computer system to the RAM 24 in the form of broadcasting or communication, or may be previously stored in a nonvolatile memory in a main body of the game apparatus. The antenna 177 receives an electrical wave of the digital broadcast. The tuner 176 extracts, from a receiving signal provided by the antenna 177, a broadcast signal of a desired channel. The demodulator 175 demodulates the broadcast signal of the desired channel extracted by the tuner 176. The decoder 174 decodes the broadcast signal demodulated by the demodulator 175, and then outputs a video signal, an audio signal, and additional information which have been multiplexed into the broadcast signal.

Although in the present embodiment, an example of reproducing video contents of the digital broadcast will be described, the present invention is not limited thereto, and is applicable to a case of reproducing video contents of an analog broadcast, video contents distributed via the Internet, or video contents provided through recording media such as a DVD. In the case of reproducing the video contents distributed via the Internet or the video contents provided through the recording media such as the DVD, a broadcast wave receiving means (such as the antenna 177 and the tuner 176) is not required.

Although, in the present embodiment, an example where the decoder 174, the demodulator 175, the tuner 176, and the antenna 177 are provided to the digital broadcast receiving card 17 will be described, a part or all of the decoder 174, the demodulator 175, the tuner 176, and the antenna 177 may be embedded in the main body of the game apparatus.

Here, the additional information represents data multiplexed into the video contents other than the video signal and the audio signal, and such examples as subtitles information (such as text, color, and display timing), program information (such as a program title, time and date of broadcasting, and a program content (summary)), a broadcasting station name, a channel number, and time and data information are named. A type and a format of the additional information vary depending on the specification of the system handling the video contents. For example, in a one-segment broadcasting which is popular in Japan as a broadcasting service for portable terminals, various additional information such as the subtitles information, an L-EIT (Event Information Table) including the program information, an NIT (Network Information Table) including information to be used for channel selection, and a TOT (Time Offset Table) including information for time correction and the like are multiplexed (time-division multiplexed) into the video signal and the audio signal. From the L-EIT, the program title, the program content, or a genre of the program can be obtained, from the NIT, the broadcasting station name or the channel number can be obtained, and from the TOT, the current time and date can be calculated. Not only with respect to the one-segment broadcasting, but also with respect to the terrestrial digital broadcasting in Japan in general, similar additional information is multiplexed into the video signal and audio signal.

Hereinafter, an operation of the game apparatus 10 will be described briefly.

Figure 5:
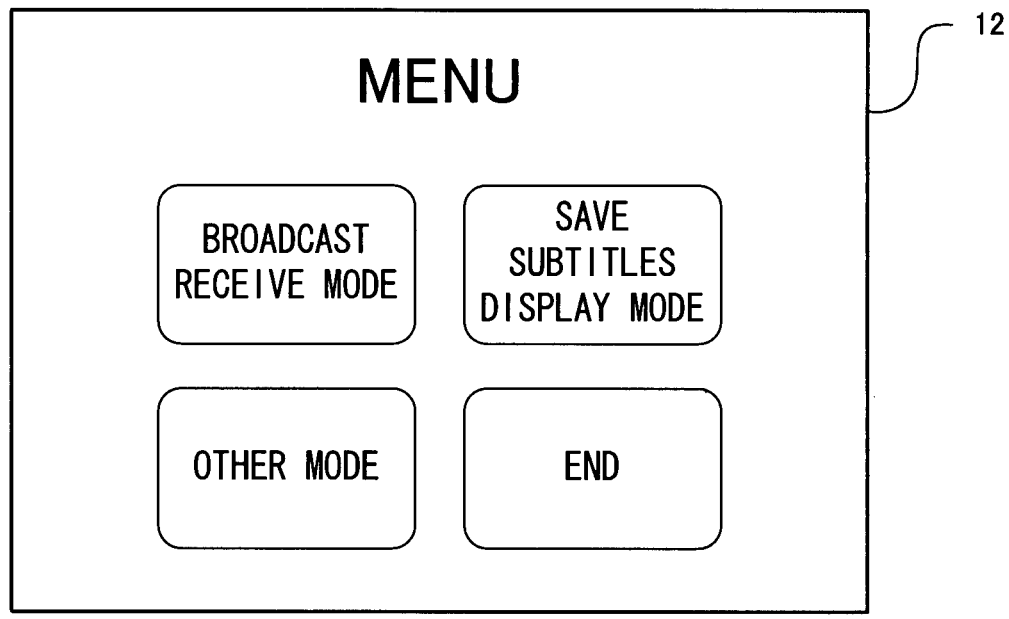
FIG. 5 is an example of a menu image displayed on a second LCD 12.

When the power is turned ON with the power supply switch 19, while the digital broadcast receiving card 17 is being inserted into the receptacle 35, the video contents display program stored in the ROM 173 is loaded into the RAM 24, and then executed by the CPU core 21. When the video contents display program is executed, a menu screen as shown in FIG. 5 is displayed on a display screen of the second LCD 12. A user can select a desired item from among four items (a "broadcast receive mode", a "save subtitles display mode", a "other mode", and an "end"), which are displayed on the menu screen. The "broadcast receive mode" is a mode for viewing a digital broadcast program in real time. The "save subtitles display mode" is a mode for reviewing subtitles of a broadcast program received in the past. The "other mode" is a mode not relating to the present invention, and represents, for example, a mode for playing a mini game. The "end" is a button for ending the execution of the video contents display program.

Figure 6:
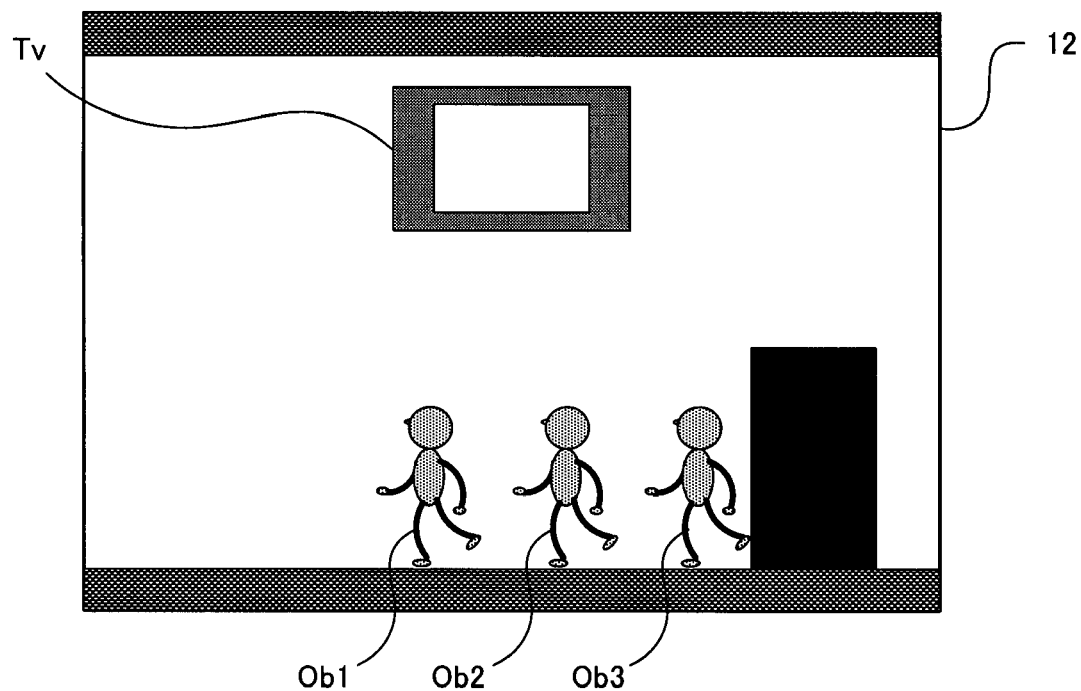
FIG. 6 is an example of an image displayed on the second LCD 12 in a broadcast receive mode.

When the user selects the "broadcast receive mode", based on the video signal, the audio signal, and the additional information inputted from the digital broadcast receiving card 17, a video of a program is displayed on the first LCD 11. The user selects a channel with the operation switch section 14, thereby freely switching the program to be displayed on the first LCD 11. In the "broadcast receive mode", while the video of the program is displayed on the first LCD 11, an appearance of a virtual space as shown in FIG. 6 is displayed on the second LCD 12. The virtual space may be a two-dimensional virtual space, or may be a three-dimensional virtual space. In the present embodiment, animation of three characters (objects Ob1 to Ob3) viewing a television broadcasting in a room having a television receiver Tv fixed therein is displayed on the second LCD 12. In the present embodiment, a screen of the television receiver Tv is simply displayed in white, however, a video of the program which the user is actually viewing (i.e. the video of the program displayed on the first LCD 11) may be displayed on the screen of the television receiver Tv. An image of the virtual space displayed on the second LCD 12 is generated in real time by computer graphics processing executed by the CPU core 21 or the GPU (the first GPU 26 and the second GPU 27). Particularly, a motion of the objects Ob1 to Ob3 is determined based on the additional information corresponding to the program displayed on the first LCD 11. Hereinafter, an example of the motion of the objects Ob1 to Ob3 in "the broadcast receive mode" will be described. Note that, since a specific image processing method relating to an animation display of the objects Ob1 to Ob3 and a virtual space display is well known to those skilled in the art, an explanation thereof will be omitted.

FIG. 6 shows a display screen of the second LCD 12 immediately after "the broadcast receive mode" starts. On the second LCD 12, an appearance of the three characters (the objects Ob1 to Ob3) entering into the room having the television receiver Tv fixed therein is displayed. Note that the motion of the objects Ob1 to Ob3 is such motion that is predetermined based on the video contents display program, and is not such motion that is based on the additional information.

Figure 7:
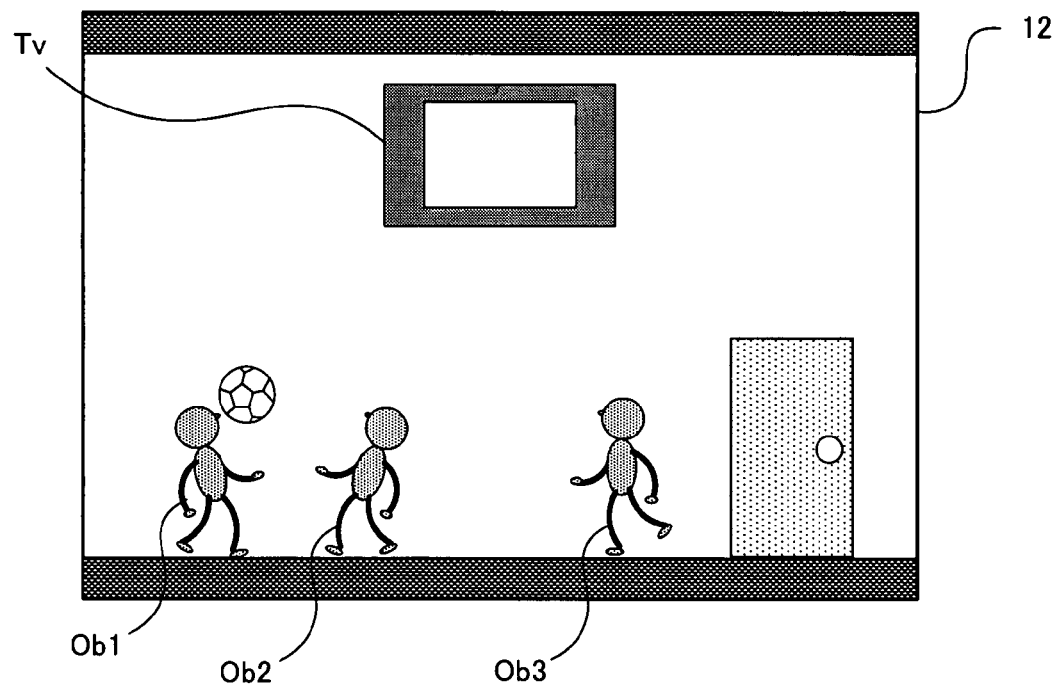
FIG. 7 is an example of an image displayed on the second LCD 12 in the broadcast receive mode.

FIG. 7 shows an appearance of the objects Ob1 to Ob3 when a soccer match program is displayed on the first LCD 11. Here, an appearance of the objects Ob1 to Ob3 kicking a soccer ball to one another is displayed on the second LCD 12. The motion of the objects Ob1 to Ob3 here is based on the above-described additional information (the program title and the program content).

Figure 8:
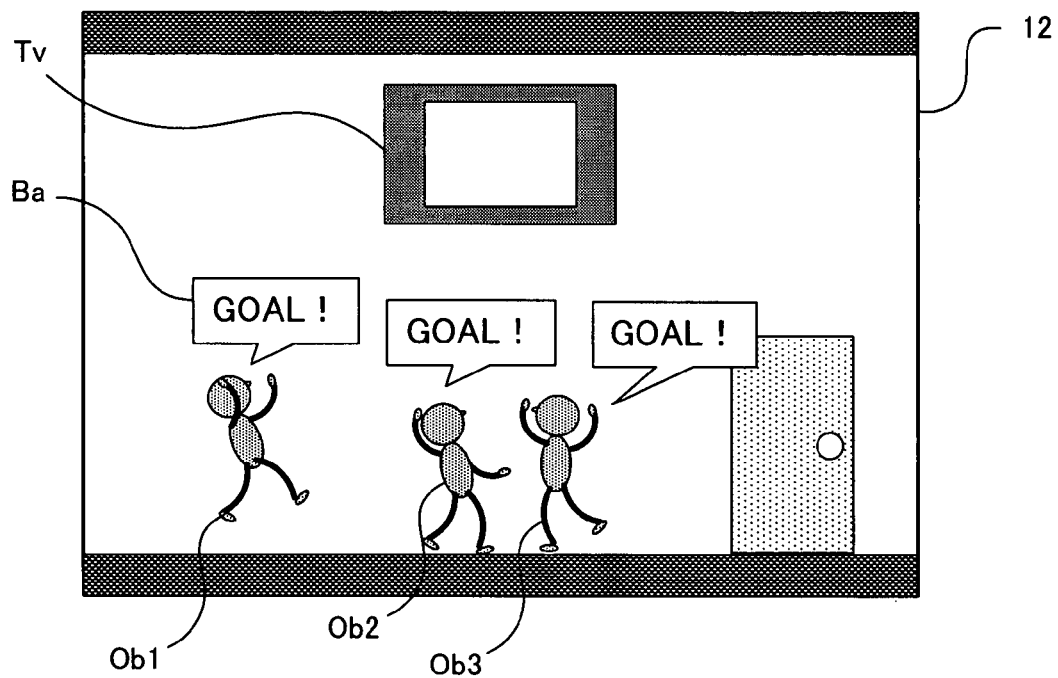
FIG. 8 is an example of an image displayed on the second LCD 12 in the broadcast receive mode.

FIG. 8 shows an appearance of the objects Ob1 to Ob3 when, in the soccer match program displayed on the first LCD 11, a soccer player has won a goal and a play-by-play announcer is shouting "goal". In this situation, a word balloon Ba saying "goal" is displayed in the vicinity of the objects Ob1 to Ob3, and additionally, an appearance of the objects Ob1 to Ob3 running round in the virtual space is displayed on the second LCD 12. A motion of the objects Ob1 to Ob3 in this situation is also based on the above-described additional information (the subtitles information).

Figure 9:
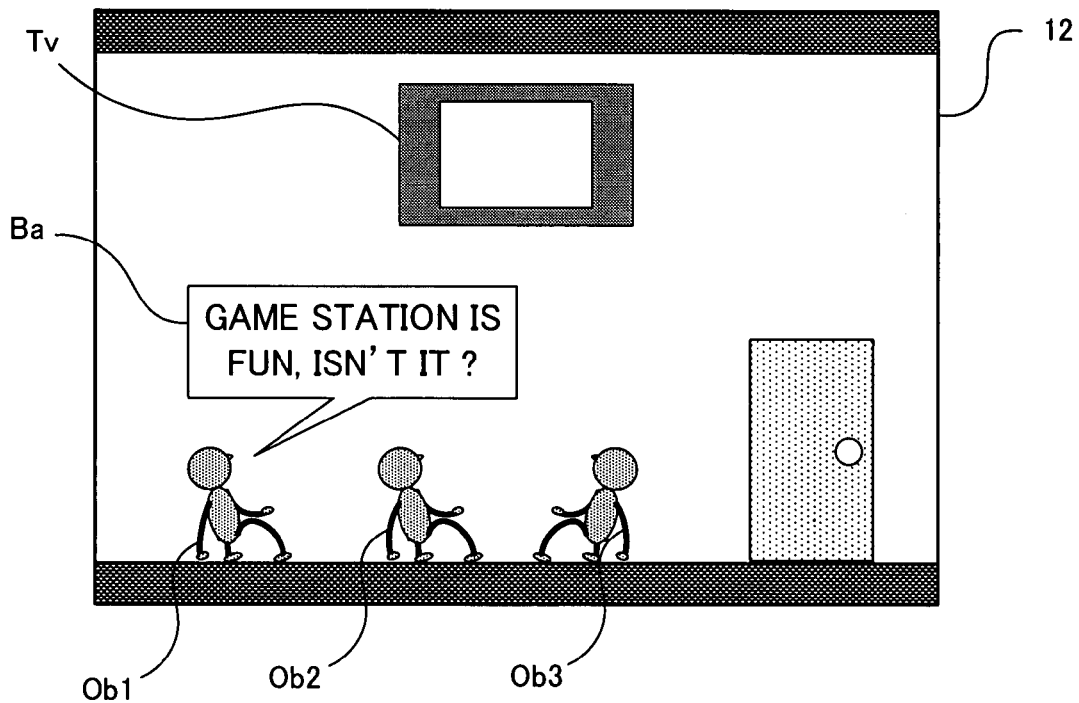
FIG. 9 is an example of an image displayed on the second LCD 12 in the broadcast receive mode.

FIG. 9 shows an appearance of the objects Ob1 to Ob3 when a title of a program called "Game Station" is displayed on the first LCD 11. In this situation, a word balloon Ba saying, "the Game Station is fun, isn't it," is displayed in the vicinity of the object Ob1. A motion of the objects Ob1 to Ob3 in this situation is also based on the above-described additional information (the program title).

Figure 10:
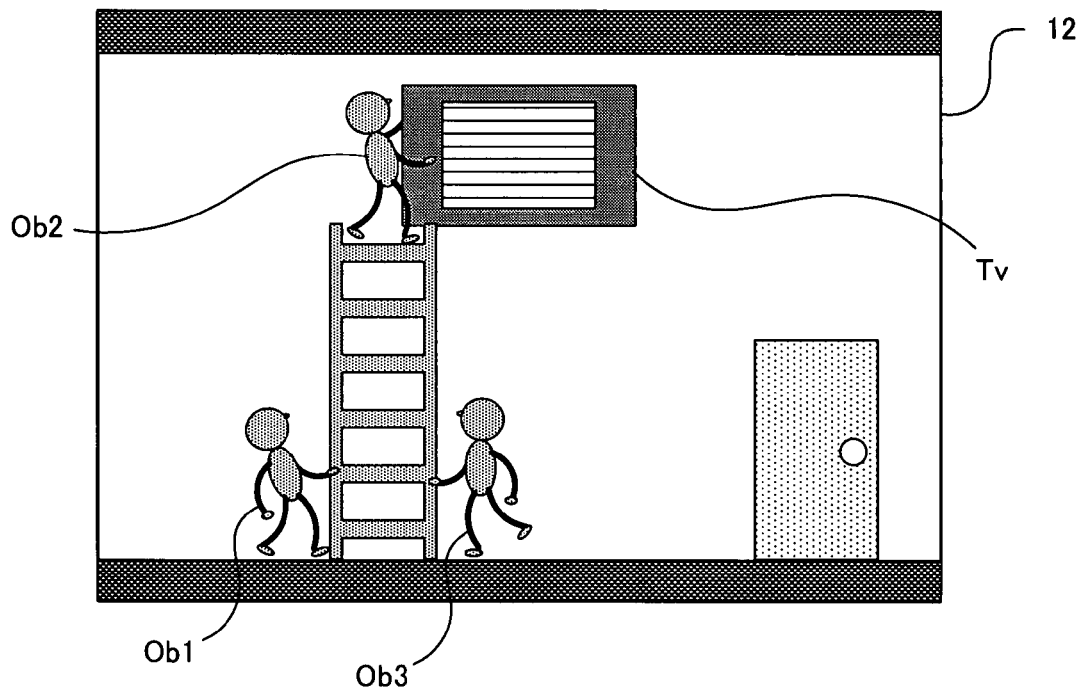
FIG. 10 is an example of an image displayed on the second LCD 12 in the broadcast receive mode.

FIG. 10 shows an appearance of the objects Ob1 to Ob3 when a video of a program is not displayed on the first LCD 11 due to a bad reception of an electrical wave. In this situation, an appearance of the objects Ob1 to Ob3 repairing the television receiver Tv fixed in the virtual space is displayed on the second LCD 12. On the first LCD 11, an error message saying that the video of the program cannot be displayed due to the bad reception of the electrical wave is displayed. A motion of the objects Ob1 to Ob3 in this situation is not based on the additional information, but based on a reception condition.

As above described, in the "broadcast receive mode", the video of the received program is displayed on the first LCD 11, and the appearance of the objects Ob1 to Ob3 moving in the virtual space in accordance with the additional information which is multiplexed into the video signal of the program is displayed on the second LCD 12. Therefore, the user feels as if viewing the program together with these characters (the objects Ob1 to Ob3)

Figure 11:
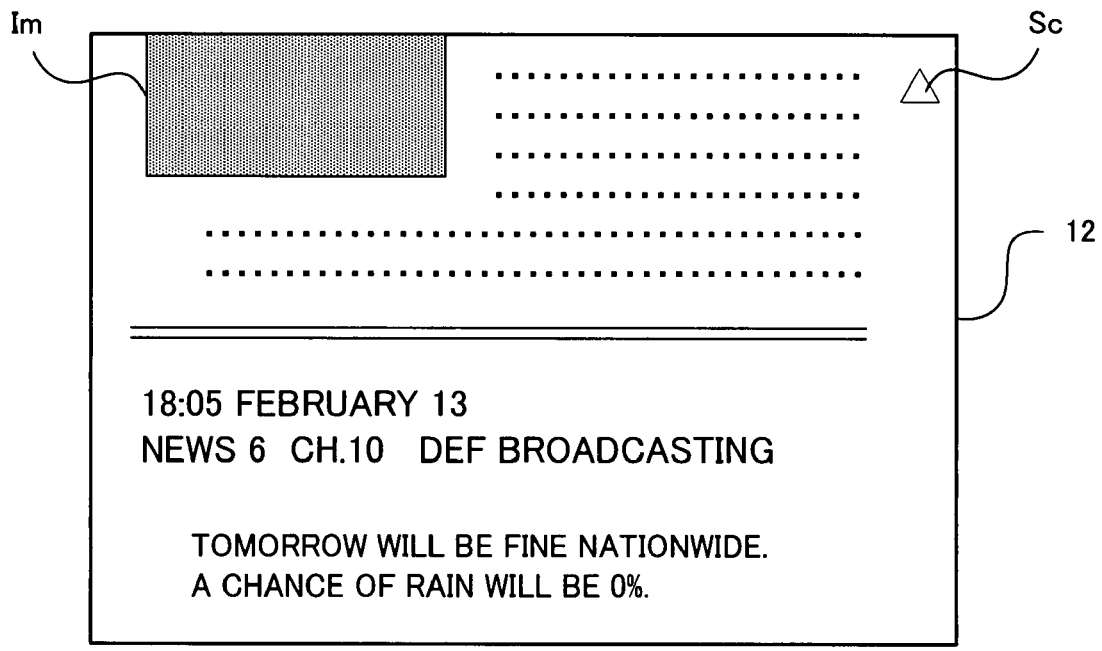
FIG. 11 is an example of an image displayed on the second LCD 12 in a save subtitles display mode.
Figure 12:
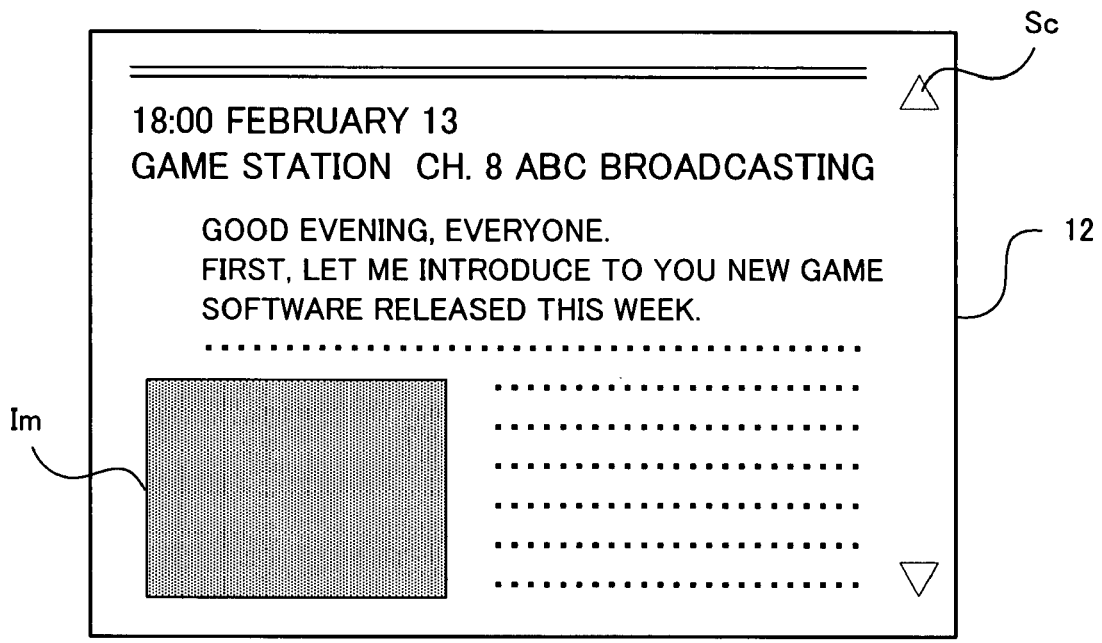
FIG. 12 is an example of an image displayed on the second LCD 12 in the save subtitles display mode.

On the other hand, when the user select the "save subtitles display mode" from the menu shown in the FIG. 5, a content of subtitles of a program which the user viewed in the past is displayed, as shown in FIG. 11. In the save subtitles display mode, not only the content of the subtitles, but also time and date when viewing of the program started, the program title, the channel number, the broadcasting station name and the like are displayed. Further, a captured image Im showing the program content is displayed at any given position. The captured image Im is an image obtained by capturing a static image at a predetermined time interval from the video signal of the program and then stored. Note that, in the second LCD 12, a scroll button Sc is displayed, and when the user touches the scroll button Sc, an image on the screen scrolls, and as shown in FIG. 12, the user can review the content of the subtitles of the program previously viewed.

Next, an operation of the game apparatus 10 will be described in more detail.

Figure 13:
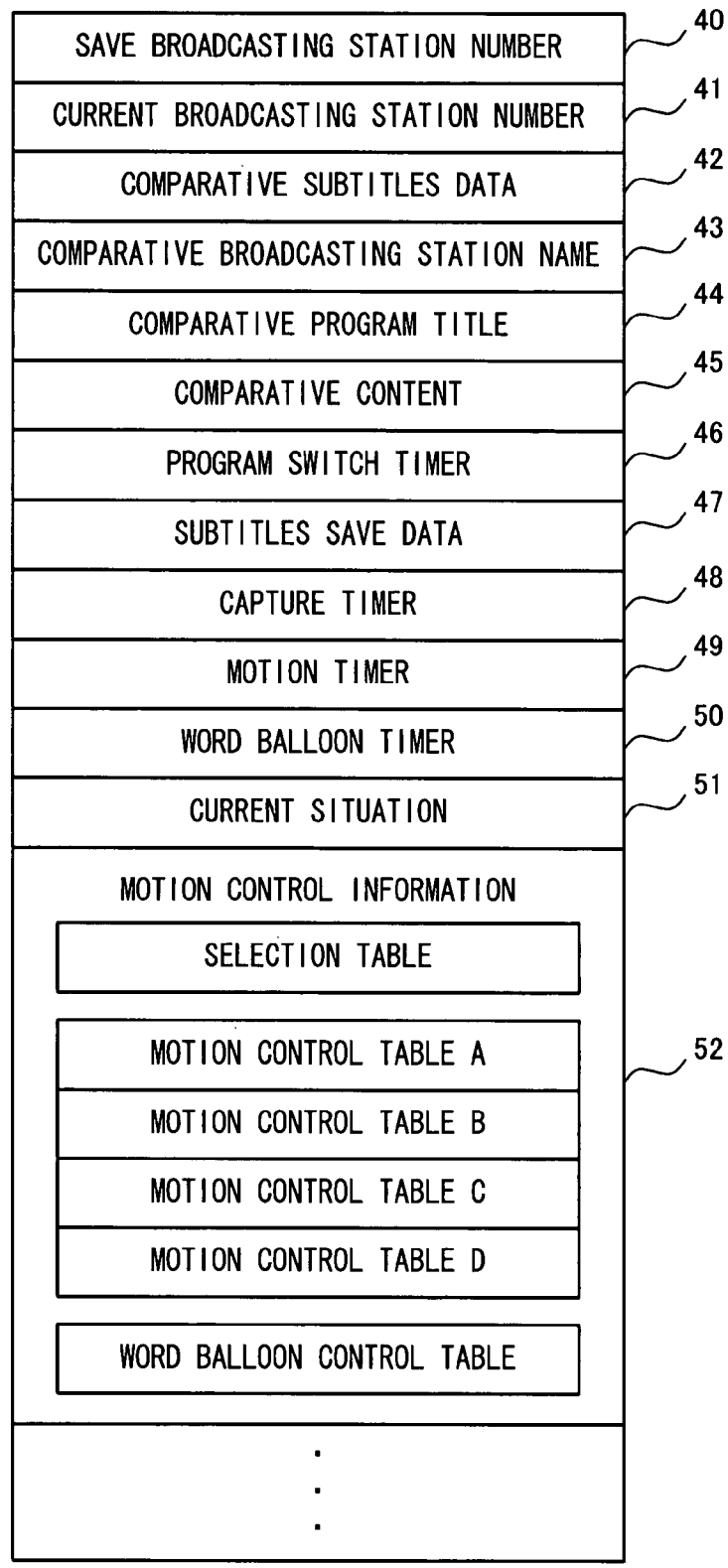
FIG. 13 is a memory map of a RAM24.

FIG. 13 shows a part of a memory map of the RAM 24. In the RAM 24, various variables and various data used at the time of executing the video contents display program is stored. Specifically, a save broadcasting station number 40, a current broadcasting station number 41, comparative subtitles data 42, a comparative broadcasting station name 43, a comparative program title 44, a comparative content 45, a program switch timer 46, subtitles save data 47, a capture timer 48, a motion timer 49, a word balloon timer 50, a current situation 51, motion control information 52 and the like are stored.

The save broadcasting station number 40 is a variable representing a broadcasting station number (a channel number) which the user viewed the last time, and is used to initially display, on the first LCD 11, the program of the channel which the user viewed the last time when the video contents display program starts to be executed. The save broadcasting station number 40 is stored by the CPU core 21 to a nonvolatile memory (not shown) embedded in the main body of the game apparatus or in the digital broadcast receiving card 17 at the time of completion of the video contents display program, and is read out by the CPU core 21 at the time of starting the video contents display program.

The current broadcasting station number 41 is a variable representing a broadcasting station number of a program currently displayed on the first LCD 11.

The comparative subtitles data 42, the comparative broadcasting station name 42, the comparative program title 44, and the comparative content 45 are variables used to respectively determine whether or not subtitles data, a broadcasting station name, a program title, and a program content of a program currently displayed on the first LCD 11 have been updated.

The program switch timer 46 is a timer used to check at least at a predetermined time interval (for example, at a 5-minute interval) whether or not the program displayed on the first LCD 11 has been switched.

The subtitles save data 47 is data for generating an image to be displayed in the above-described "save subtitles display mode", and, as shown in FIG. 11, includes text data such as the time and data when broadcasting of the program started, the program title, and the subtitles information, as well as the captured image. In this manner, the subtitles save data 47 is basically composed of the text data and static image data, and thus a capacity of a storage area required for storage becomes much smaller compared to a case where a video signal and an audio signal of the program are stored as they are. The subtitles save data may be in any format, and for example, a general mark-up language such as an XML (extensible Markup Language), and an HTML (Hyper Text Markup Language) may be used.

The capture timer 48 is a timer used to obtain, at a predetermined time interval from a video of the program being viewed, a captured image to be used in the "save subtitles display mode".

The motion timer 49 is a timer used to count the minimum time during which the objects Ob1 to Ob3 continue a single motion (that is, the minimum time interval from starting of a motion to starting of the next motion).

The word balloon timer 50 is a timer used to count the minimum time during which a single word balloon is continuously displayed (that is, the minimum time interval from starting of a word balloon display to starting of another word balloon display).

The current situation 51 is a variable to retain the current situation of the objects Ob1 to Ob3.

The motion control information 52 is information to determine a motion of the objects Ob1 to Ob. The motion control information 52 includes a selection table, a plurality of motion control tables (motion control tables A to D), and a word balloon control table.

The selection table is a table to select a motion control table, from among the motion control tables A to D, to be used to determine a motion of the objects Ob1 to Ob3. FIG. 14 shows an example of the selection table. The selection table specifies, for example, in the case where the objects Ob1 to Ob3 are sleeping in the current situation, a motion of the objects Ob1 to Ob3 is determined by using the object motion table C.

The motion control table A is a table to determine a motion of the objects Ob1 to Ob3 in accordance with character string data such as the program title, the program content, and the subtitles among the additional information which is multiplexed into the video signal of the program currently viewed (that is, the additional information outputted from the decoder 174 at that point of time). FIG. 15 shows an example of the motion control table A. The motion control table A specifies, for example, in the case where a keyword "soccer" is included in the character string data in the additional information, the objects Ob1 to Ob3 are caused to kick a soccer ball to one another. The motion control table A also specifies execution time of the motion. This is also applied to tables B to D.

Although, in the present embodiment, the motion control table A is a table to determine the motion of the objects Ob1 to Ob3 in accordance with given character string data included in the additional information multiplexed into the video signal of the program currently viewed, the present invention is not limited thereto. For example, such motion control table may be used that determines the motion of the objects Ob1 to Ob3 only with reference to the program title data included in the additional information, such motion control table may be used that determines the motion of the objects Ob1 to Ob3 only with reference to the program content data, or such motion control table may be used that determines the motion of the objects Ob1 to Ob3 only with reference to the subtitles data. Further, such motion table may be used that determines the motion of the objects Ob1 to Ob3 with reference to any two of the program title data, the program content data, and the subtitles data, or alternatively, the motion of the objects Ob1 to Ob3 may be determined with reference to only three data of the program title data, the program content data, and the subtitles data.

The motion control table B is a table to determine the motion of the objects Ob1 to Ob3 in accordance with the date data, such as a broadcasting date, of the additional information multiplexed into the video signal of the program currently viewed. FIG. 16 shows an example of the motion control table B. The motion control table B specifies, for example, in the case where the date data represents December 24, the objects Ob1 to Ob3 are caused to have a Christmas party.

The motion control table C is a table to determine the motion of the objects Ob1 to Ob3 in accordance with time data, such as a current time, a program start time, and a program end time, of the additional information multiplexed into the video signal of the program currently viewed. FIG. 17 shows an example of the motion control table C. The motion control table C specifies that, for example, in the case where the time data represents 0 o'clock, the objects Ob1 to Ob3 are caused to sleep. The content of the motion of the objects Ob1 to Ob3 may be specified by "minutes" or "seconds" of the time data.

The motion control table D is a table to determine the motion of the objects Ob1 to Ob3 in accordance with genre data, (a genre name or a genre number) representing a genre of a program, of the additional information multiplexed into the video signal of the program currently viewed. FIG. 18 shows an example of the motion control table D. Here, the genre of each of the programs is defined hierarchically as main genre data and intermediate genre data. The motion control table D specifies that, for example, in the case where the main genre data represents a variety, and the intermediate genre data represents a quiz, the objects Ob1 to Ob3 are caused to nod. The content of the motion of the objects Ob1 to Ob3 may be specified in accordance with only either one of the main genre data or the intermediate genre data.

The word balloon control table is a table, by using a character string and figures included in the additional information (such as the program title and the time and date) multiplexed into the video signal of the program currently viewed, to cause the objects Ob1 to Ob3 to speak words including the character string and the figures (more accurately, to display a word balloon including the character string and the figures). FIG. 19 shows an example of the word balloon control table. The word balloon control table specifies that, for example, in the case where the objects Ob1 to Ob3 are caused to speak words including the program title (for example, "Game Station"), the objects Ob1 to Ob3 are caused to say "Game Station is popular, isn't it?" or to say "Game Station is fun, isn't it?" The content of the word balloon is specified depending on the type of information to be included in the word balloon (target information) (for example, the program title, the time and data, and the like).

Each of the above described motion control tables A to D and the word balloon control table is merely an example. As another example of the motion control table, in the case where an intermediate genre of a program currently viewed is a soccer, and a character string "goal" is included in the subtitles data corresponding to a scene currently displayed, the objects Ob1 to Ob3 may be caused to shout "goal" and to run round in the virtual space. That is, such motion control table may be used that determines the motion of the objects Ob1 to Ob3 in accordance with a combination of different types of the additional information. Further, as another example, when the word balloon is displayed, the word balloon content may be changed in accordance with an area code included in the additional information, so as to cause the objects Ob1 to Ob3 to speak a dialect of a region represented by the area code. Further, as another example, in accordance with the area code included in the additional information, not only the word balloon content is changed, but also a background image or an object relating to the area represented by the area code may be displayed, or the music or a sound effect relating to the area represented by the area code may be reproduced.

Next, with reference to flow charts of FIG. 20 to FIG. 29, processing flows of the CPU core 21 based on the video contents display program will be described.

Figure 20:
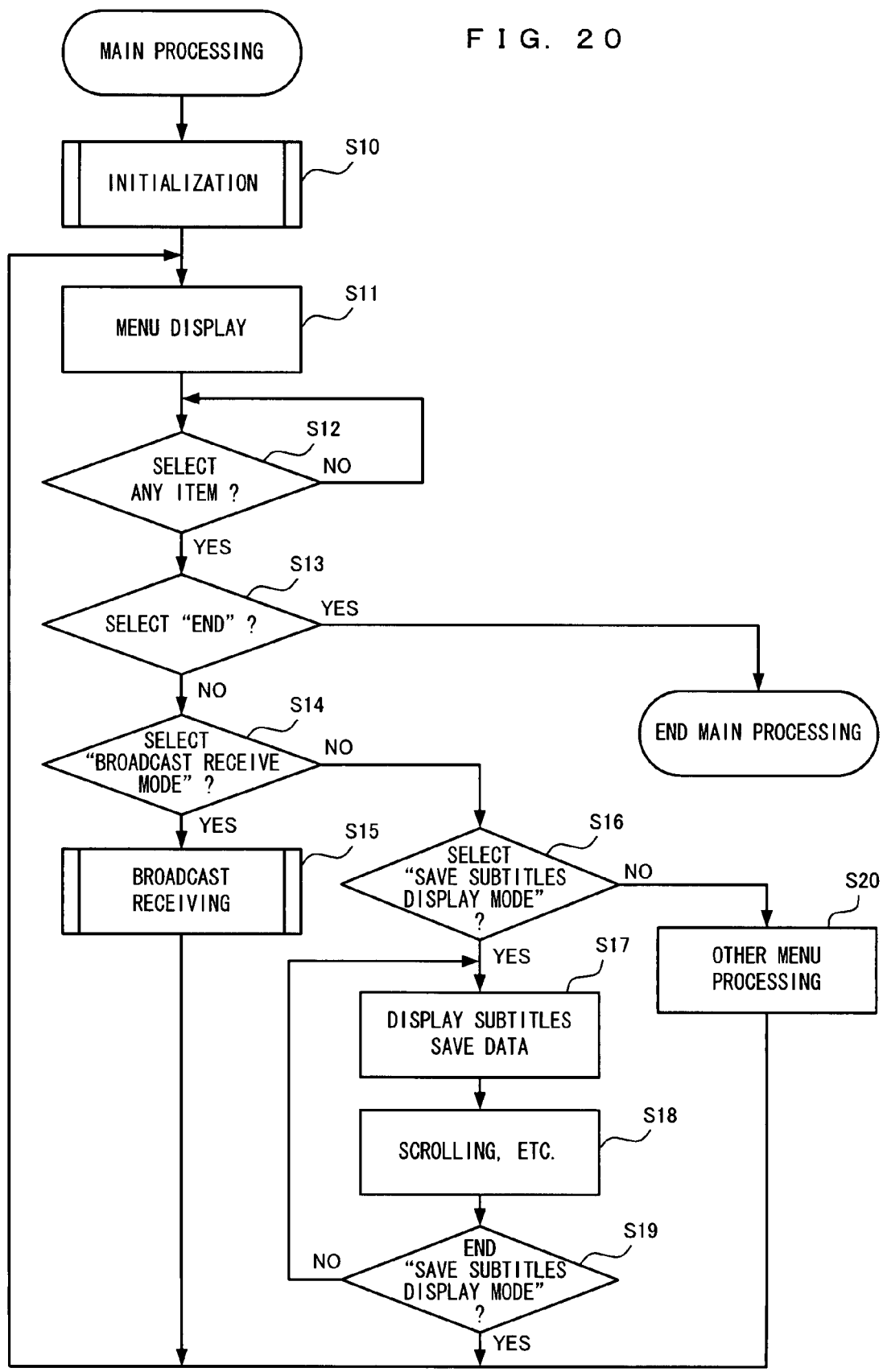
FIG. 20 is a flowchart illustrating a main processing.

When the execution of the video contents display program starts, a main processing shown in FIG. 20 is performed first.

Figure 21:
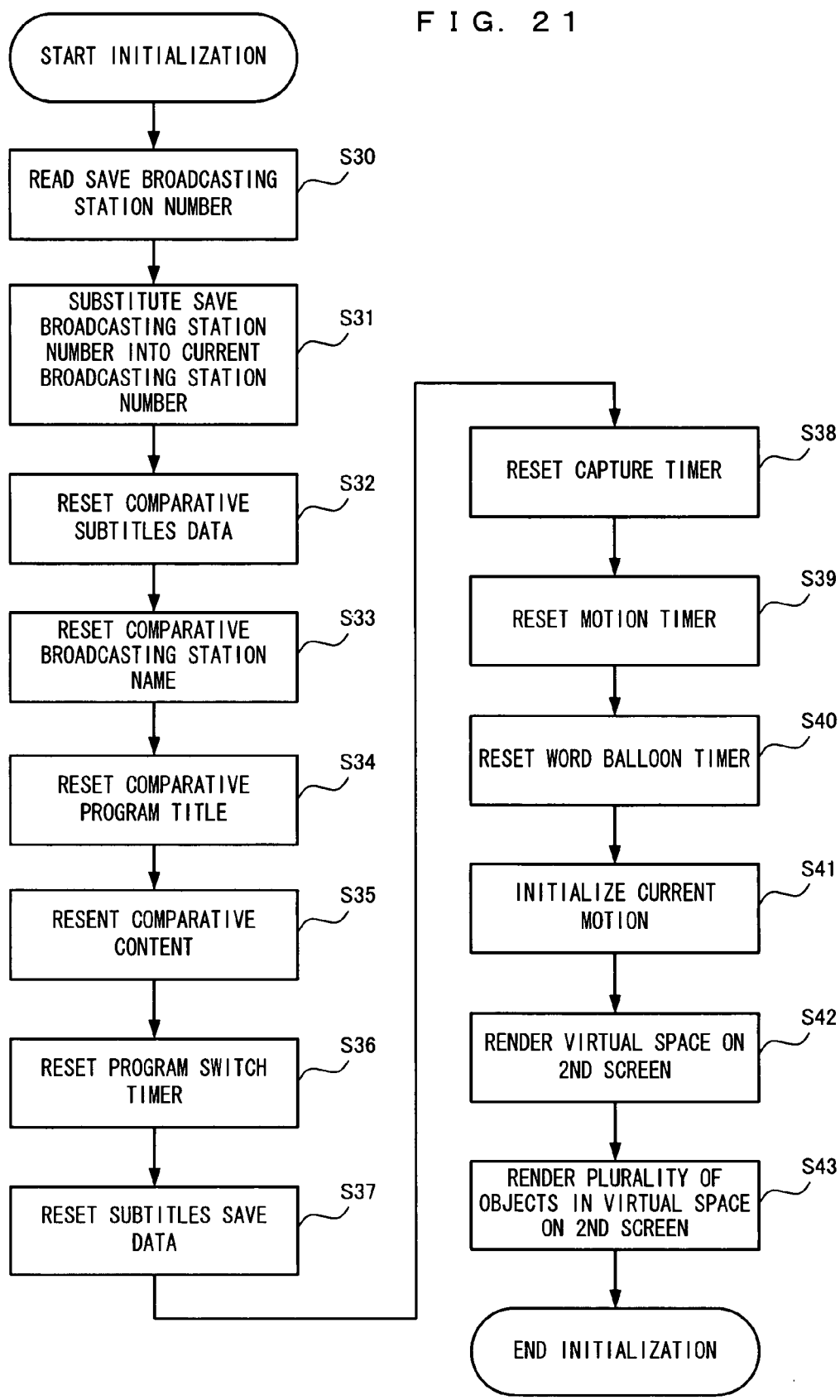
FIG. 21 is a flowchart illustrating initialization.

In step S10, the CPU core 21 performs initialization. The content of the initialization is shown in FIG. 21.

When the initialization starts, the CPU core 21 first reads, in step S30, from a nonvolatile memory which is not shown, the above-described save broadcasting station number (that is, the broadcasting station number of the program viewed the last time).

In step S31, the CPU core 21 substitutes the save broadcasting station number read in step S30 into the current broadcasting station number 41.

In step S32, the CPU core 21 resets the comparative subtitles data 42.

In step S33, the CPU core 21 resets the comparative broadcasting station name 43.

In step S34, the CPU core 21 resets the comparative program title 44.

In step S35, the CPU core 21 resets the comparative content 45.

In step S36, the CPU core 21 resets the program switch timer 46.

In step S37, the CPU core 21 rests the subtitles save data 47.
In step S38, the CPU core 21 resets the capture timer 48.
In step S39, the CPU core 21 resets the motion timer 49.
In step S40, the CPU core 21 resets the word balloon timer 50.

In step S41, the CPU core 21 initializes the current situation 51.

In step S42, the CPU core 21 renders a virtual space (a ceiling, a floor, a door, a television receiver Tv and the like) on the second LCD 12 (hereinafter referred to as second screen)

In step S43, the CPU core 21 renders a plurality of objects Ob1 to Ob3 in the virtual space.

Upon completion of the initialization as above described, an image as shown in FIG. 6 is displayed on the second screen.

Returning to FIG. 20, in step S11, the CPU core 21 renders a menu as shown in FIG. 5 on the second screen.

In step S12, the CPU core 21 determines whether or not any item of the menu is selected by the user, and proceeds to step S13 if any of the items is selected. The item may be selected by the user with the use of the touch panel 15, or with the use of the operation switch section 14.

In step S13, the CPU core 21 determines whether or not the "end" is selected from the menu, and ends the main processing when the "end" is selected (that is, ends the execution of the video contents display program). In the case where any other item than the "end" is selected from the menu, the CPU core 21 proceeds to step S14.

In step S14, the CPU core 21 determines whether or not the "broadcast receive mode" is selected from the menu, and proceeds to step S15 in the case where the "broadcast receive mode" is selected, and proceeds to step S16 in the case where another item is selected.

In step S15, the CPU core 21 executes broadcast receiving (to be described below for detail). Upon completion of receiving the broadcast, the CPU core 21 returns to step S11.

In step S16, CPU core 21 determines whether or not the "save subtitles display mode" is selected from the menu, and proceeds to step S17 in the case where the "save subtitles display mode" is selected, and proceeds to step S20 in the case where the "other mode" is selected.

In step 17, CPU core 21 generates an image as shown in FIG. 11 in accordance with the subtitles save data 47 and then displays the image on the second screen. For example, in the case where the subtitles save data 47 is in an HTML format, the CPU core 21 interprets the subtitles save data 47 in the HTML format, and generates an image to be displayed on the second screen.

In step S18, the CPU core 21 executes processing such as scrolling in accordance with an instruction inputted by the user through the touch panel 15 or the operation switch section 14.

In step S19, CPU core 21 determines whether or not the "save subtitles display mode" ends, and returns to step S11 in the case where the "save subtitles display mode" ends, and returns to step S17 in the case where the "save subtitles display mode" has not ended. The "save subtitles display mode" ends in accordance with an end instruction inputted by the user through the touch panel 15 or the operation switch section 14.

In step S20, the CPU core 21 executes processing of the "other mode" (for example, execution of a mini game), and then returns to step S11.

Figure 22:
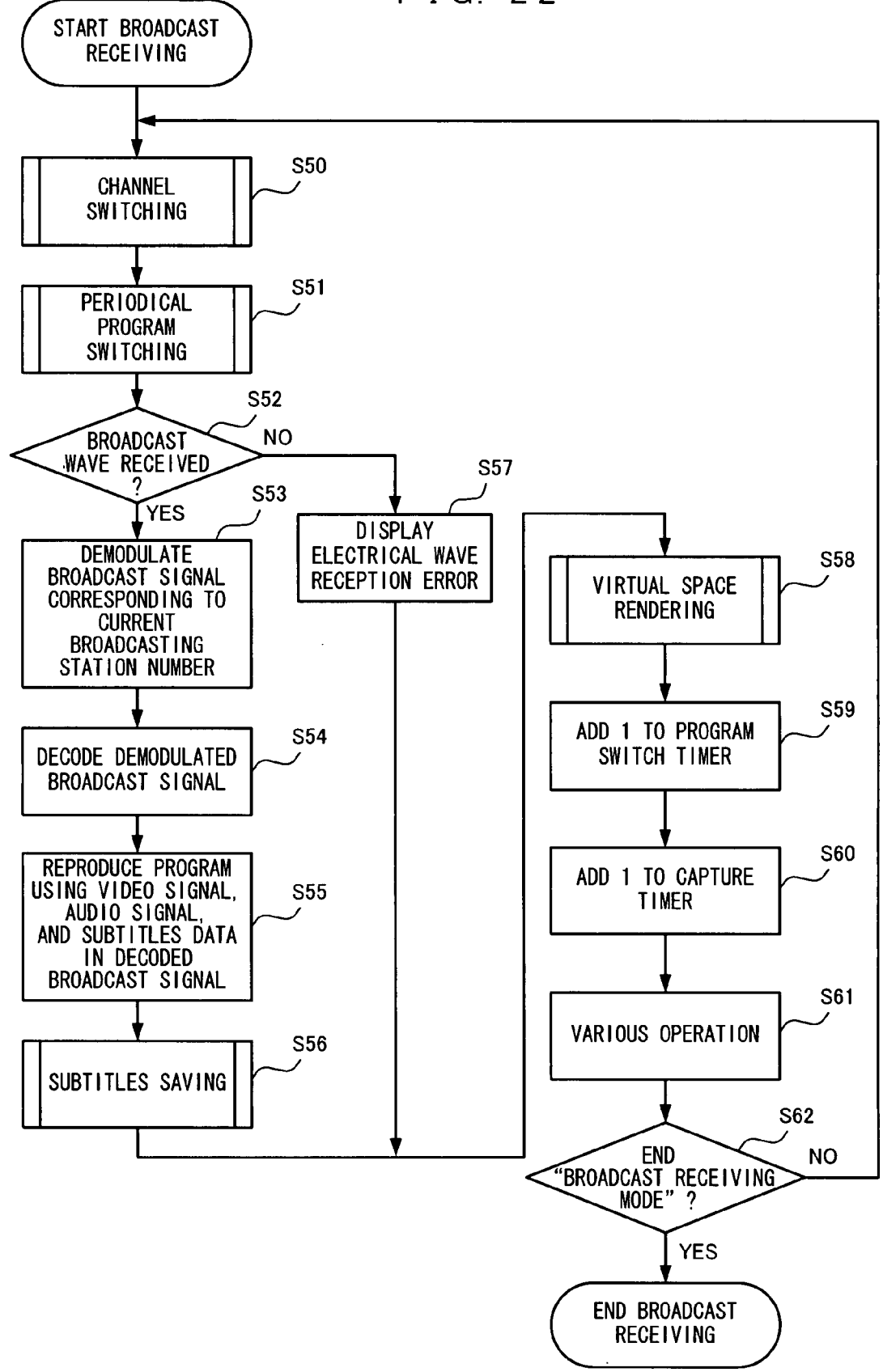
FIG. 22 is a flowchart illustrating broadcast receiving.
Figure 23:
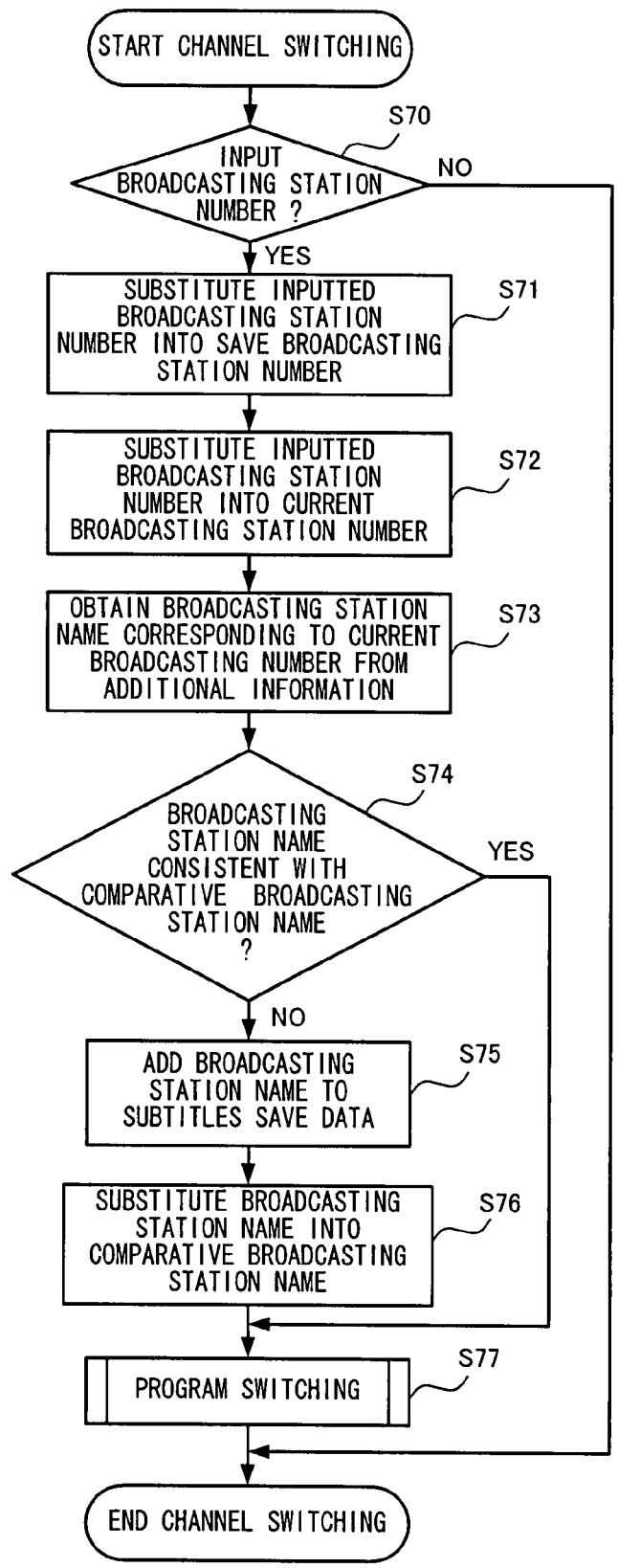
FIG. 23 is a flowchart illustrating channel switching.

Next, with reference to FIG. 22, the broadcast receiving of step S15 in FIG. 20 will be described in detail.

In step S50, the CPU core 21 executes channel switching. The channel switching will be shown in FIG. 23 in detail.

When the channel switching starts, the CPU core 21 determines, in step S70, whether or not the user has inputted the broadcasting station number with the use of the touch panel 15 or the operation switch section 14, and proceeds to step S71 in the case where the broadcasting station number is inputted, and ends the channel switching in the case the broadcasting station number is not inputted.

In step S71, the CPU core 21 substitutes the broadcasting station number inputted by the user into the save broadcasting station number 40.

In step S72, the CPU core 21 substitutes the broadcasting station number inputted by the user into the current broadcasting station number 41.

In step S73, the CPU core 21 obtains the broadcasting station name corresponding to the current broadcasting station number 41 from the additional information multiplexed into the received digital broadcast signal.

In step S74, the CPU core 21 determines whether or not the broadcasting station name obtained in step S73 is consistent with the comparative broadcasting station name 43, and proceeds to step S77 in the case of their being consistent with each other, and proceeds to step S75 in the case of their not being consistent with each other.

In step S75, the CPU core 21 adds the broadcasting station name obtained in step S73 to the subtitles save data 47. In the case where the data size of the subtitles save data 47 becomes large, old data is deleted as appropriate.

In step S76, the CPU core 21 substitutes the broadcasting station name obtained in step S73 into the comparative broadcasting station name 43.

Figure 24:
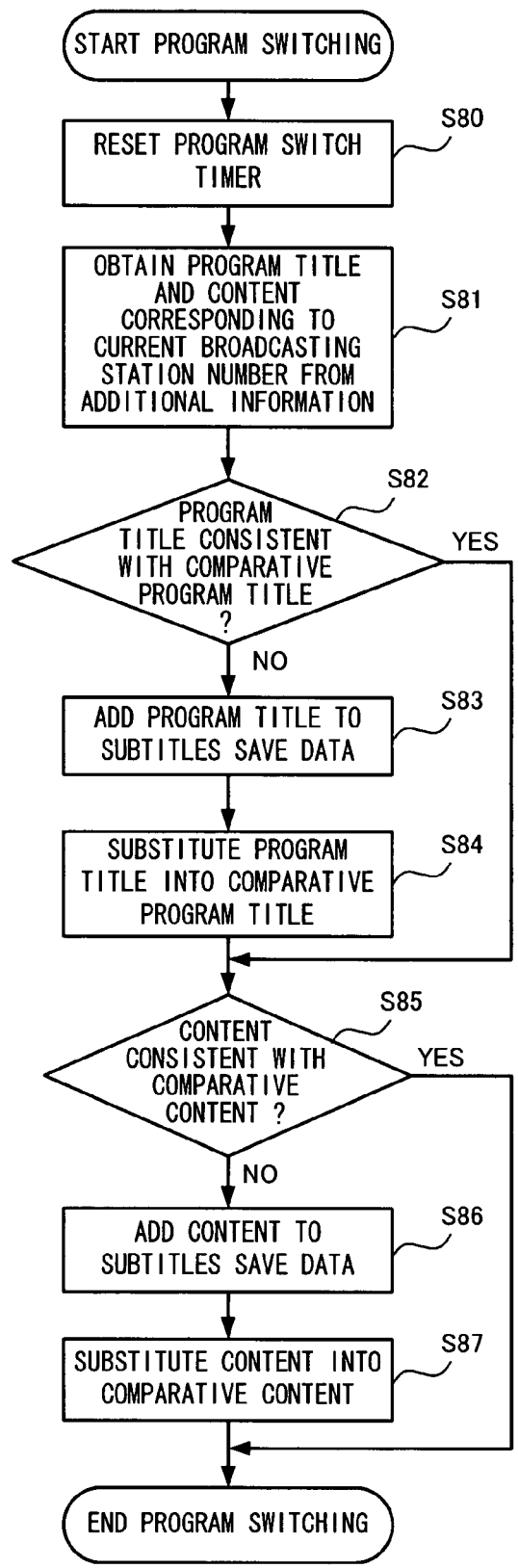
FIG. 24 is a flowchart illustrating program switching.

In step S77, the CPU core 21 executes program switching. The program switching is shown in FIG. 24 in detail.

When the program switching starts, the CPU core 21 first resets, in step S80, the program switch timer 46.

In step S81, the CPU core 21 obtains, from the additional information multiplexed into the received digital broadcast signal, the program title and content (a summary of the program) corresponding to the current broadcasting station number 41.

In step S82, the CPU core 21 determines whether or not the program title obtained in step S81 is consistent with the comparative program name 44, and proceeds to step S85 in the case of their being consistent with each other, and proceeds to step S83 in the case of their not being consistent with each other.

In step S83, the CPU 21 adds the program title obtained in step S81 to the subtitles save data 47. In the case where the data size of the subtitles save data 47 becomes large, the old data is deleted as appropriate.

In step S84, the CPU core 21 substitutes the program title obtained in step S81 into the comparative program name 44.

In step S85, the CPU core 21 determines whether or not the content obtained in step S81 is consistent with the comparative content 45, and ends the program switching in the case of their being consistent with each other, and proceeds to step S86 in the case of their not being consistent with each other.

In step S86, the CPU core 21 adds the content obtained in step S81 to the subtitles save data 47. In the case where the data size of the subtitles save data 47 becomes large, the old data is deleted as appropriate.

In step S87, the CPU core 21 substitutes the content obtained in step S81 into the comparative content 45, and then ends the program switching.

As is clear from the above description, the program switching is processing to add, when a program being viewed is switched, information relating to a program after the switching to the subtitles save data 47. Although the example of adding the program title and the content to the subtitles save data 47 is described here, the present invention is not limited thereto, and other information (for example, such as the channel number, the program viewing start time, as shown in FIG. 11) may be added to the subtitles save data 47. Accordingly, when a program being viewed is switched due to a channel switching operation by the user, information relating to a program after the switching is to be added to the subtitles save data 47.

Returning to FIG. 23, when the program switching in step S77 is completed, the CPU core 21 ends the channel switching.

Figure 25:
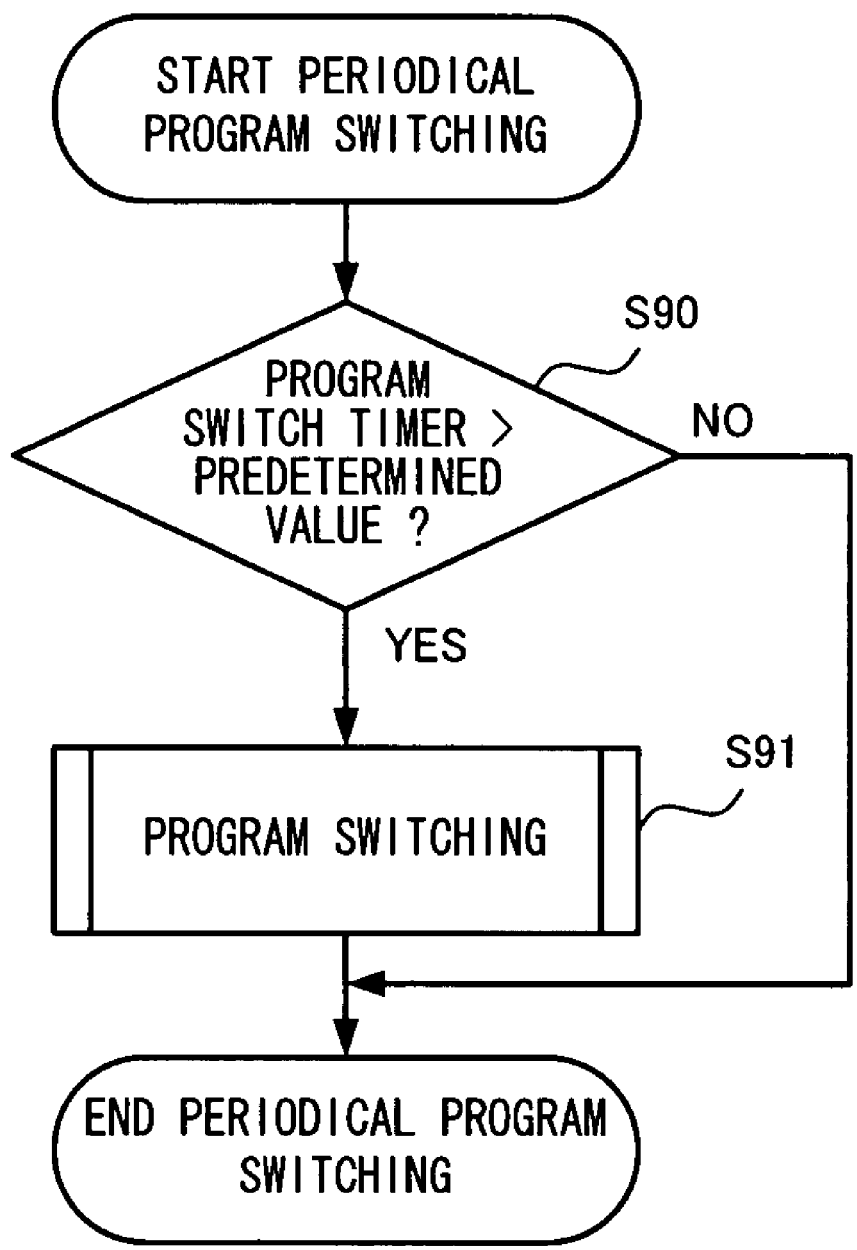
FIG. 25 is a flowchart illustrating periodical program switching.

Returning to FIG. 22, when the channel switching in step S50 is completed, the CPU core 21 executes, in step S51, periodical program switching. The periodical program switching is shown in FIG. 25 in detail.

When the periodical program switching starts, the CPU core 21 first determines, in step S90, whether or not a value of the program switch timer 46 is larger than a predetermined value, and proceeds to step S91, in the case of its being larger than the predetermined value, or ends the periodical program switching in the case of its not being larger than the predetermined value.

In step S91, the CPU core 21 executes the above-described program switching (see FIG. 24), and then ends the periodical program switching.

With the periodical program switching as above described, not only in the case where the user performs the channel switching operation, but also in the case, for example, where while the user is viewing a program A of a given broadcasting station number, broadcasting of the program A ends and the next program B starts, it is possible to add information relating to the program B to the subtitles save data 47. That is, when a program ends and the next program starts in a single channel, information relating to the next program is added to the subtitles save data 47.

Returning to FIG. 22, when the periodical program switching of step S51 is completed, the CPU core 21 determines, in step S52, whether or not the antenna 177 has received a broadcast wave of a desired digital broadcasting, and proceeds to step S53 in the case where the antenna 177 has received the broadcast wave, and proceeds to step S57 in the case where the antenna 177 has not received the broadcast wave.

In step S53, a broadcast signal corresponding to the current broadcasting station number 41 is extracted from the received signal inputted from the antenna 177, and then demodulated by the demodulator 175.

In step S54, the broadcast signal demodulated by the demodulator 175 is decoded by the decoder 174.

In step S55, the CPU core 21 displays, using a video signal, an audio signal, and subtitles data included in the broadcast signal decoded by the decoder 174, a video of the program on the first LCD 11 (hereinafter referred to as first screen), and outputs a sound of the program through the right loud speaker 30*a* and the left loud speaker 30*b*. The subtitles need not necessarily be displayed on the first screen. That is, it may be possible to set such that the user can freely switch between a subtitles display mode and a subtitles non-display mode. The subtitles data includes information indicating a timing of every screenful of text to be displayed on the screen, and the CPU core 21 displays, based on the display timing information, the subtitles in synchronicity with the video. Even in the subtitles non-display mode, it is possible to control the object Ob1 to Ob3, by reference to the subtitles data and the display timing information contained therein, and by using a character string of the subtitles corresponding to a video scene being displayed on the first screen.

Figure 26:
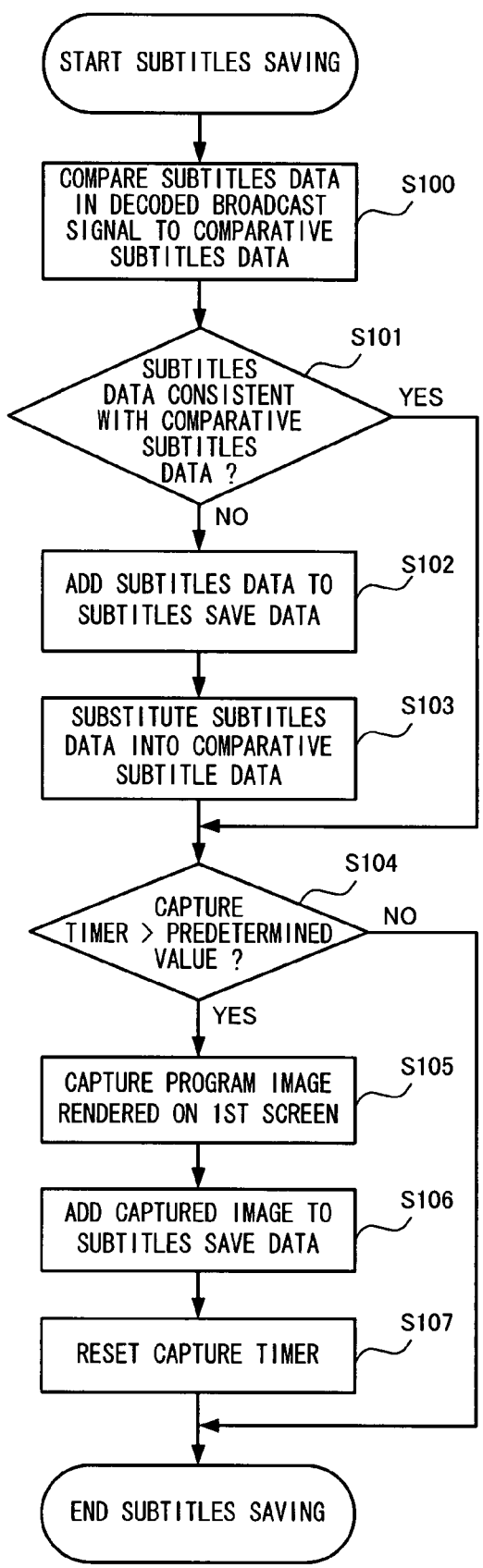
FIG. 26 is a flowchart illustrating subtitles saving.

In step S56, the CPU core 21 executes subtitles saving. The subtitles saving is shown in FIG. 26 in detail.

When the subtitles saving starts, the CPU core 21 first compares, in step S100, the subtitles data included in the broadcast signal, which is decoded by the decoder 174, to the comparative subtitles data 42.

In step S101, the CPU core 21 determines, based on the result of the comparison in step S100, whether or not the subtitles data included in the broadcast signal is consistent with the comparative subtitles data 42, and proceeds to step S104 in the case of their being consistent with each other, and proceeds to step S102 in the case of their not being consistent with each other.

In step S102, the CPU core 21 adds the subtitles data included in the broadcast signal to the subtitles save data 47. Accordingly, the subtitles data (for example, text data saying, "tomorrow will be fine nationwide" as shown in FIG. 11) corresponding to a scene being displayed on the first screen is added to the subtitles save data 47. When the data size of the subtitles save data 47 becomes large, old data is deleted as appropriate.

In step S103, the CPU core 21 substitutes the subtitles data included in the broadcast signal into the comparative subtitles data 42.

In step S104, the CPU core 21 determines whether or not a value of the capture timer 48 is larger than a predetermined value, and proceeds to step S105 in the case of its being larger than the predetermined value, and ends the subtitles saving in the case of its not being larger than the predetermined value.

In step S105, the CPU core 21 captures an image of the program currently displayed on the first screen. Capture of the image of the program is realized by capturing the video signal included in the broadcast signal decoded by the decoder 174, and is executed, for example, by reading the image data from a frame buffer to be used for rendering on the first screen.

In step S106, the CPU core 21 adds the image captured in step S105 to the subtitles save data 47. Accordingly, a static image (for example, the captured image Im as shown in FIG. 11) corresponding to a video being displayed is added to the subtitles save data 47. In the case where the data size of the subtitles save data 47 becomes large, the old data is deleted as appropriate.

In step S107, the CPU core 21 resets the capture timer 48, and then ends the subtitles saving.

Returning to FIG. 22, when the subtitles saving in step S56 is completed, the processing proceeds to step S58.

In step S57, the CPU core 21 displays, on the first screen, an error message saying that a video of the program cannot be displayed due to a bad reception of the electrical wave.

Figure 27:
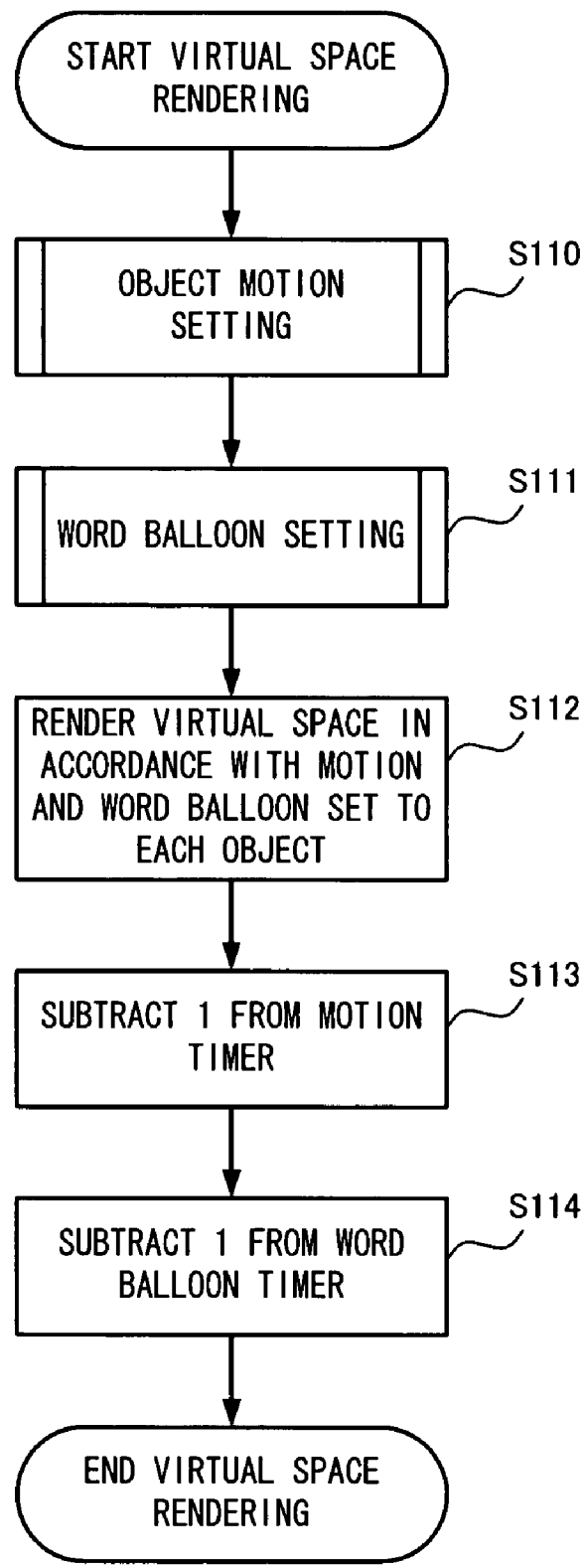
FIG. 27 is a flowchart illustrating virtual space drawing.
Figure 28:
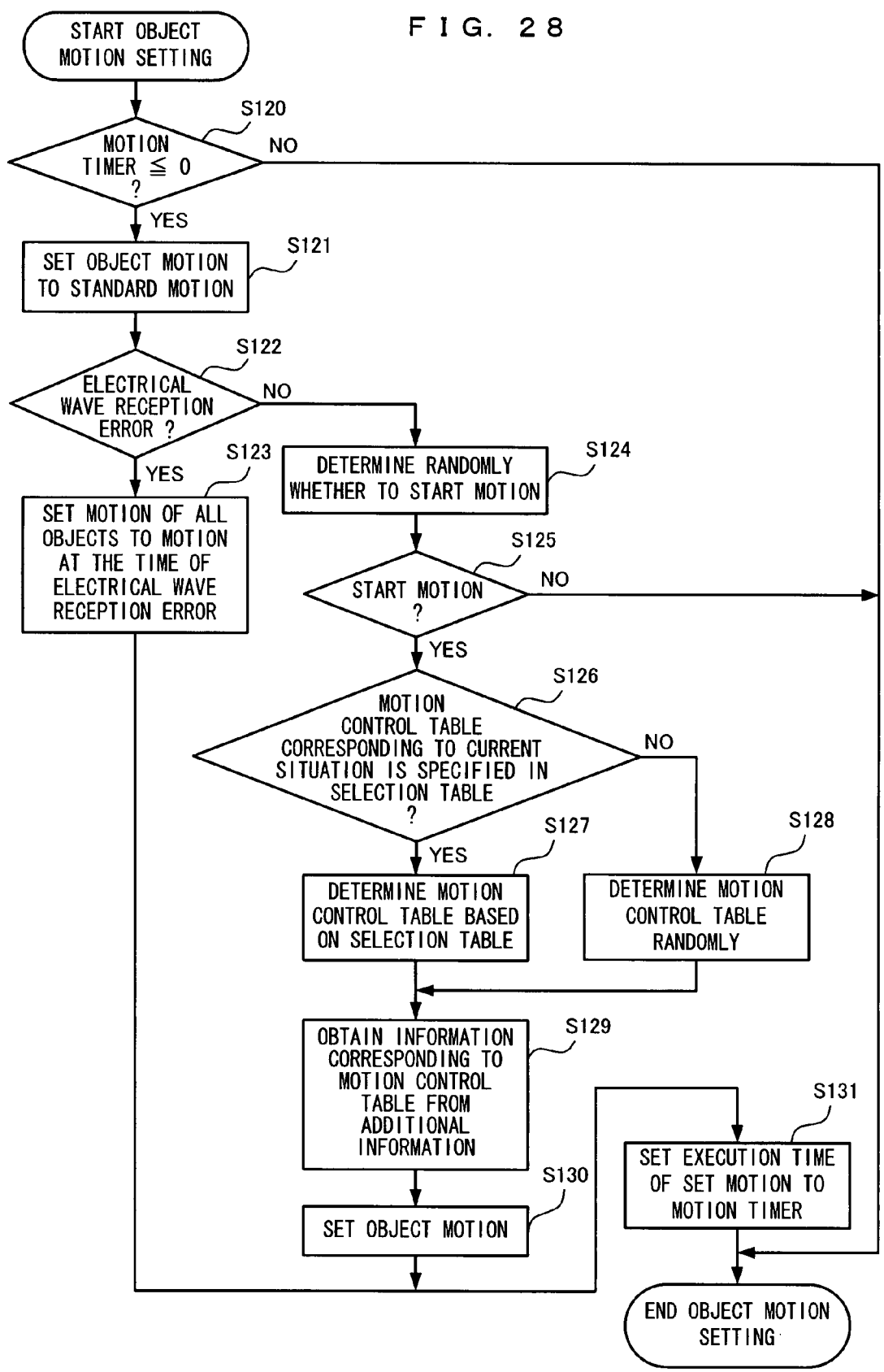
FIG. 28 is a flowchart illustrating object motion setting.

In step S58, the CPU core 21 executes virtual space rendering. The virtual space drawing is shown in FIG. 27 in detail.

When the virtual space drawing starts, the CPU core 21 first executes, in step S110, object motion setting. Hereinafter, with reference to FIG. 28, the object motion setting will be described.

When the object motion setting starts, the CPU core 21 first determines, in step S120, whether or not a value of the motion timer 49 is zero ("0") or smaller, and proceeds to step S121 in the case of being "0" or smaller, and ends the object motion setting in the case of being larger than "0". Therefore, once the objects Ob1 to Ob3 start a certain motion, a new motion will not be started during a period until the value of the motion timer 49 becomes "0", and accordingly, it is possible to avoid a case where the motion of the objects Ob1 to Ob3 changes at short times and the user cannot catch the motion of the objects Ob1 to Ob3.

In step S121, the CPU core 21 sets the motion of the objects to a standard motion. The standard motion, in this case, represents a motion of the objects Ob1 to Ob3 quietly viewing a video, for example. The set motion of the object is retained as a current situation 51 (This is also applied to the description below).

In step S122, the CPU core 21 determines whether or not it is under an electrical wave reception error (that is, whether or not the antenna 177 can receive the broadcast wave of a desired digital broadcasting), and proceeds to step S123 in the case where it is under the electrical wave reception error, and proceeds to step S124 in the case it is not under the electrical wave reception error.

In step S123, the CPU core 21 sets the motion of all the objects Ob1 to Ob3 to a motion at the time of the electrical wave reception error, and proceeds to step S131. The motion at the time of the electrical wave reception error, in this case, represents, for example, a motion of repairing the television receiver as shown in FIG. 10.

In step S124, the CPU core 21 determines randomly, for example, by using random numbers, whether or not to cause any of the objects Ob1 to Ob3 to perform any other motion than the standard motion. In the case where the CPU core 21 determines to cause the any other motion to be performed, the CPU core 21 proceeds to YES in step S125 (that is, proceeds to step S126), and in the case where the CPU core 21 determines not to cause the any other motion to be performed, the CPU core 21 proceeds to NO in step S125 (that is, ends the object motion setting). In this manner, whether or not to cause the objects Ob1 to Ob3 to perform a motion is determined randomly, and timing of the objects Ob1 to Ob3 starting the motion is randomized, whereby the motion of the objects Ob1 to Ob3 in the virtual space looks more natural.

In above-described step S124, whether or not to cause any of the objects Ob1 to Ob3 to perform any other motion than the standard motion is determined randomly, however, the present invention is not limited thereto. That is, it may be possible to set such that the CPU core 21 proceeds to step S126 when a predetermined condition is satisfied, and ends the object motion setting when the predetermined condition is not satisfied. As examples of the predetermined condition, there may be a case where a predetermined motion switch timing has come, a case where a predetermined time has come, a case where a program has been changed, a case where a viewing channel has been changed, or a case where the standard motion continues for a predetermined time or longer.

In step S126, the CPU core 21 determines whether or not the motion control table corresponding to the current situation 51 is specified in the selection table (for example, that of FIG. 14), and proceeds to step S127 in the case where the motion control table corresponding to the current situation 51 is specified, and proceeds to step S128 in the case where the motion control table corresponding to the current situation 51 is not specified. For example, in the case where the current situation 51 represents a "sleeping situation", the motion control table (motion control table C) corresponding to the "sleeping" condition is specified in the selection table, and thus the processing proceeds to step S127 after step S126.

In step S127, the CPU core 21 determines, with reference to the selection table, a motion control table to be used to set, in step S130 described below, the motion of objects from among a plurality of the motion control tables included in the motion control information 52.

In step S128, the CPU core 21 randomly determines, by using, for example, random numbers, from among the plurality of the motion control tables included in the motion control information 52, the motion control table to be used to set, in step S130 described below, the motion of the object. Instead of selecting randomly the motion control table, the motion control table may be selected one by one in accordance with a predetermined order. When the motion control table is selected randomly, it is possible to effectively avoid a case where the objects Ob1 to Ob3 perform a motion in a regular manner. When the motion control table is selected one by one in accordance with the predetermined order, it is possible to effectively prevent the objects Ob1 to Ob3 from repeating a single motion.

In step S129, the CPU core 21 obtains information corresponding to the motion control table determined in step S127 or step S128 from among the additional information (that is the additional information outputted from the decoder 174) corresponding to the video being displayed on the first screen. For example, in the case where the motion control table determined in step S127 or step S128 represents the motion control table A of FIG. 15, information on the program title, the program content, and the subtitles is obtained from the additional information corresponding to the video being displayed on the first screen. In a similar manner, in the case where the motion control table determined in step S127 or step S128 represents the motion control table B of FIG. 16, the date information is obtained from the additional information corresponding to the video being displayed on the first screen.

In step S130, the CPU core 21 sets the motion of the objects Ob1 to Ob3 (that is, revises the current situation 51) in accordance with the motion control table determined in step S127 or step S128 and also in accordance with the information obtained in step S129. For example, in the case where the motion control table determined in step S127 or step S128 represents the motion control table A of FIG. 15, and also in the case where a keyword "soccer" is included in the program title obtained in step S129, then as a motion of the objects Ob1 to Ob3, a motion of the objects kicking a soccer ball to one another is set. In the case where the motion of the objects corresponding to the information obtained in step S129 is not specified in the motion control table determined in step S127 or step S128, the motion of the objects may be, for example, set to the standard motion, or the objects may be caused to keep the current motion.

In step S131, the CPU core 21 obtains, from the motion control table determined in step S127 or step S128, the execution time of the motion which is set in step S130, sets a value in accordance with the execution time into the motion timer 49, and then ends the object motion setting.

Returning to FIG. 27, upon completion of the object motion setting in step S110, the processing proceeds to step S111.

Figure 29:
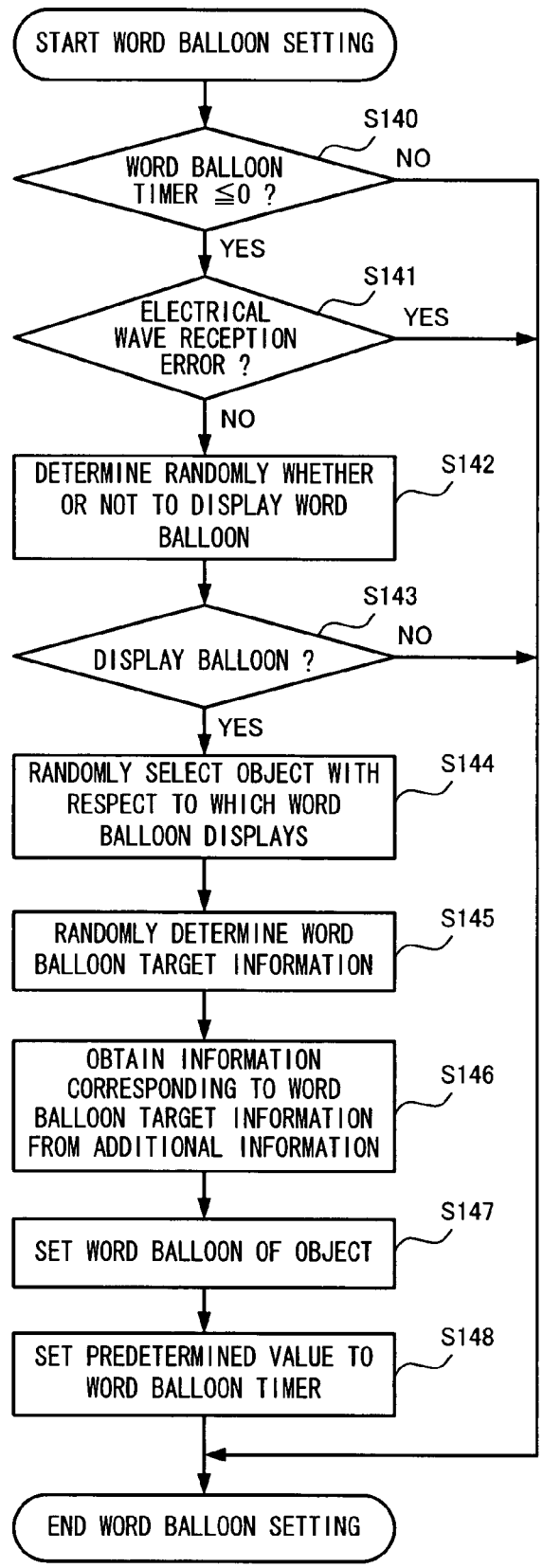
FIG. 29 is a flowchart illustrating word balloon setting.

In step S111, the CPU core 21 performs the word balloon setting. The word balloon setting is shown in FIG. 29 in detail.

When the word balloon setting starts, the CPU core 21 first determines, in step S140, whether or not a value of the word balloon timer 50 is zero ("0") or smaller, and proceeds to step S141 in the case of its being "0" or smaller, and ends the word balloon setting in the case of its being larger than "0". Therefore, once a word balloon is displayed, another word balloon will not be displayed until the word balloon timer 50 finishes counting from a predetermined value down to 0, whereby it is possible to avoid a case where the content of the word balloon changes at short times and the user fails to catch the content of the word balloon.

In step S141, the CPU core 21 determines whether or not it is under an electrical wave reception error (that is whether or not the antenna 177 cannot receive a broadcast wave of a desired digital broadcasting), and ends the word balloon setting in the case where it is under the electrical wave reception error, and proceeds to step S142 in the case where it is not under the electrical wave reception error.

In step S142, the CPU core 21 determines, by using, for example, random numbers, whether or not to display the word balloon. The processing proceeds to YES in step S143 (that is, proceeds to step S144) in the case where it is determined that the word balloon is to be displayed, and proceeds to NO in step S143 (that is, ends the word balloon setting) in the case where it is determined that the word balloon is not to be displayed. In this manner, whether or not to display the word balloon is determined randomly, and consequently timing of the word balloon to be displayed is randomized, whereby the motion of the objects Ob1 to Ob3 in the virtual space looks more natural.

In step S144, the CPU core 21 randomly determines, by using, for example, random number, from among the objects Ob1 to Ob3, an object in the vicinity of which word balloon is to be displayed.

In step S145, the CPU core 21 determines the information to be included in the word balloon (target information) randomly by using, for example, random numbers. As specific examples of the target information to be included in the word balloon, the program title, the date, the time, the broadcasting station name, and the channel number as shown in FIG. 19 can be named. In this manner, the target information to be included in the word balloon is determined randomly, and consequently the content of the word balloon to be displayed changes randomly, whereby it is possible to prevent the user from getting bored.

In step S146, the CPU core 21 obtains the target information determined in step S145 from the additional information corresponding to the video being displayed on the first screen. For example, in the case where the target information determined in step S145 is the program title, the program title of the video being displayed on the first screen is obtained.

In step S147, the CPU core 21 sets the word balloon for the object selected in step S144 by using the content of the word balloon specified in the word balloon control table and the information obtained in step S146. For example, in the case where the information obtained in step S146 is the program title called "Game Station", a word balloon including either of the character strings, "Game Station is popular, isn't it?" or "Game Station is fun, isn't it?" is set in accordance with the word balloon table of FIG. 19. In an example in FIG. 19, two word balloon contents are specified with respect to the program title, and in such case, the word balloon content to be used may be randomly determined each time, or may be determined in accordance with a predetermined rule.

In step S148, a predetermined value is set into the word balloon timer, and the word balloon setting is completed. The value to be set to the word balloon timer 50 may be changed in accordance with the word balloon set in step S147 (for example, in accordance with a length of a character string in the word balloon) instead of always setting a single value into the word balloon timer 50. In the case where it is set such that the longer character string the word balloon contains, the larger value is set into the word balloon timer 50, then the longer character string the word balloon contains, the longer time the word balloon is displayed, whereby the user can easily catch the content of the word balloon.

Returning to FIG. 27, upon completion of the word balloon setting in step S111, the processing proceeds to step S112.

In step S112, the CPU core 21 renders an appearance of a virtual space on which the motion set in step S110 and the word balloon set in step S111 are reflected. Accordingly, as shown in FIG. 7 to FIG. 9, an appearance of the objects Ob1 to Ob3 moving in conjunction with the video displayed on the first screen is displayed on the second screen.

In step S113, the CPU core 21 subtracts 1 from the value of the motion timer 49.

In step S114, the CPU core 21 subtracts 1 from the value of the word balloon timer 50, and then ends the virtual space rendering.

Returning to FIG. 22, upon completion of the virtual space rendering in step S58, the processing proceeds to step S59.

In step S59, the CPU core 21 adds 1 to the value of the program switch timer 46.

In step S60, the CPU core 21 adds 1 to the value of the capture timer 48.

In step S61, various processing is performed in accordance with various operation inputted by the user (for example, motion mode switching, subtitles display ON/OFF switching, image scale-up/scale-down, and the like).

In step S62, the CPU core 21 determines whether or not the "broadcast receive mode" has ended, and ends the broadcast reception when the "broadcast receive mode" has ended, and returns to step S50 in the case where the "broadcast receive mode" has not ended.

In the present embodiment, with the processing as above described, it is possible, when the user views a program of a digital broadcasting, to display, on the second screen, the appearance of the characters moving in the virtual space in conjunction with the additional information multiplexed into the broadcast signal, thereby providing an unprecedented novel entertainment. Particularly, like the subtitles information, for example, by controlling the motion of the characters with the use of the additional information which changes depending on the scene of the video, it is possible to cause the characters to move depending on the scene currently displayed, whereby the user can feel as if viewing a single program together with the characters.

Further in the present embodiment, with the processing as above described, the content of the subtitles is recorded on the subtitles save data 47 at any time, and thus the user can freely review the content at a later time through the "save subtitles display mode", which is highly convenient. For example, even in the case where the user temporarily stops viewing of the program during viewing of the program due to another concerns, it is possible to check the content of the program through the "save subtitles display mode" after completion of the concerns. Further, in the "save subtitles display mode", not only the content of the subtitles, but also information relating to the program other than the subtitles (such as the program title, the broadcasting station name, and the like) are displayed, and thus the user can easily catch the subtitles of the program which the subtitles displayed in the "save subtitles display mode" corresponds to. Further, in the "save subtitles display mode", the captured image Im is also displayed, and thus it is possible to catch the content of the program easily, compared to a case where only the subtitles are displayed. Further in the "save subtitles display mode", the user can review not only the subtitles of the program currently viewed, but also the subtitles of the program previously viewed, and thus even if the user stops viewing a program (program A) in the middle of the viewing, and the next program B is broadcasted when the user resumes viewing of the program at a later time, the user can check the content of the program A through the "save subtitles display mode".

Further, in the present embodiment, the example where one tuner 176 is provided to the digital broadcast receiving card 17 is described, however, the present invention is not limited thereto, and a plurality of tuners may be provided. In this case, it is possible for the user to record, as needed, on the subtitles save data 47, a content of subtitles of a program other than the program which the user is viewing, and review the content through the "save subtitles display mode" at a later time.

In the present embodiment, although the case of viewing the program of the digital broadcasting is described, the present invention is not limited thereto, and the present invention may be applied to a case of viewing a program of analog broadcasting, a case of viewing video contents recorded in a recording media such as a DVD (for example, video contents with closed captions), or a case of viewing video contents distributed via the Internet.

Further, in the present embodiment, although the case of viewing the program of the digital broadcasting in real time is described, the present invention is not limited thereto, and the present invention may be applicable to a case of viewing a program recorded on a memory device such as a hard disk. The motion of the objects can be determined in real time and randomly when a video is displayed on the first screen, and thus even in the case of viewing a recorded program repeatedly many times, the motion pattern of the objects changes each time, which prevents the user from getting bored.

Further, in the present embodiment, although the example of displaying three objects Ob1 to Ob3 on the second screen is described, the present invention is not limited thereto, and only one object may be displayed on the second screen, or the number of the objects to be displayed on the second screen may be changed depending on the situation.

Further, in the present embodiment, although the example of causing the three objects Ob1 to Ob3 to perform a single motion is described, the present invention is not limited thereto, and the motion of each of the objects may be controlled individually. In this case, the motion timer 49, the word balloon timer 50, and the current situation 51 may be prepared for each of the objects. Further, different motion control tables may be provided to each of the objects. Further, it may be possible to allocate attribute information (such as character, sex, and age) to each of the objects, and then arrange different motion control tables by object groups having common attribute information. Accordingly, it is possible to express a personality of an object (such as character and possible motions).

Further, in present embodiment, although the example of saving the content of the subtitles to the subtitles save data 47 when a video of the program is displayed on the first screen is described, the present invention is not limited thereto. For example, even when the user is not viewing a program, and a video of the program is not displayed on the first screen (for example, when the game apparatus 10 is in a power saving mode, and the display on the first screen is OFF), it may be possible to cause the content of the subtitles to be recorded on the subtitles save data 47 as needed. Accordingly, the user can review the subtitles and the captured image Im of the program through the "save subtitles display mode" at a later time, even if the user does not view the program in real time.

Further in the present embodiment, although the example of one tuner 176 provided to the digital broadcast receiving card 17 is described, the present invention is not limited thereto, and a plurality of the tuners may be provided. In this case, it is possible for the user to record, on the subtitles save data 47, a content of subtitles of a program other than the program being viewed, and then review the content at a later time through the "save subtitles display mode".

Further in the present embodiment, the example of obtaining, from the video signal of the program, the static image as the captured image Im at a predetermined time interval is described, the present invention is not limited thereto. For example, the static image may be captured from the video signal of the program, by analyzing the video signal, when the video signal changes significantly (at the time of scene changing), or the static image may be captured from the video signal of the program at the time of channel switching by the user. Alternatively, the static image may be captured from the video signal immediately after the program starts. Further, the time interval for capturing the static image from the video signal of the program may be changed depending on the genre information of the program (in this case, the time interval by genre is previously defined in the video contents display program).

While the invention has been described in detail, the foregoing content is in all aspects illustrative and not restrictive. It is understood that numerous other modifications and variations can be devised without departing from the scope of the invention.

What is claimed is:

1. A non-transitory computer readable storage medium storing a video contents display program for displaying video contents,
   the video contents having additional information relating to the video contents added thereto, and
   the video contents display program causing a computer of a video contents display apparatus to execute:
   displaying the video contents in a contents display screen area;
   displaying, in a virtual space display screen area, a two-dimensional or a three-dimensional virtual space and an object appearing in the two-dimensional or the three-dimensional virtual space, the virtual space display screen area being a different display screen area from the contents display screen area; and
   controlling, when the video contents are displayed in the contents display screen area, a motion of the object such that the object moves based on the video contents by using the additional information of the video contents and motion control information which specifies the motion of the object when the additional information satisfies a predetermined condition.

2. The non-transitory computer readable storage medium according to claim 1, wherein, in the motion control information, the motion of the object when a predetermined character string or a code is included in the additional information is specified.

3. The non-transitory computer readable storage medium according to claim 1, wherein,
   a plurality of types of the additional information is added to the video contents,
   the motion control information includes a plurality of motion control tables corresponding to various types of the additional information, and
   the video contents display program causes the computer to further execute selecting one of the plurality of motion control tables, and determining the motion of the object with reference to the selected motion control table.

4. The non-transitory computer readable storage medium according to claim 3, wherein one of the plurality of motion control tables is selected randomly when a predetermined condition is satisfied.

5. The non-transitory computer readable storage medium according to claim 3, wherein motion control tables are selected one by one from the plurality of motion control tables in accordance with a predetermined order when a predetermined condition is satisfied.

6. The non-transitory computer readable storage medium according to claim 3, wherein with reference to a selection table which defines a correlation between a current situation of the object and the plurality of motion control tables, one of the plurality of motion control tables is selected in accordance with the current situation of the object.

7. The non-transitory computer readable storage medium according to claim 1, wherein
   the video contents includes broadcast contents, and
   in the motion control information, the motion of the object is specified in the case where at least one of subtitles information, program identification information, broadcasting station identification information, broadcast area identification information, broadcast time and data information, and viewing age restriction information, which are multiplexed into the broadcast contents, satisfies a predetermined condition.

8. The non-transitory computer readable storage medium according to claim 1, wherein the video contents display program causes the computer to further execute generating text by combining a character string contained in the additional information and a character string previously prepared, and displaying the generated text as a word balloon of the object.

9. The non-transitory computer readable storage medium according to claim 1, wherein the video contents display program further causes the computer to execute counting elapsed time since the motion of the object has changed, and
   wherein the motion of the object is controlled such that, the object continues a single motion from a time when the motion of the object has changed until a time when a predetermined execution time has passed.

10. The non-transitory computer readable storage medium according to claim 9, wherein, with reference to a motion control table which defines a correlation between the motion of the object and execution time, whether or not the predetermined execution time has passed since the motion of the object has changed is determined.

11. The non-transitory computer readable storage medium according to claim 1, wherein the contents display screen area is an area in a first screen, and the virtual space display screen area is an area in a second screen which is different from the first screen.

12. The non-transitory computer readable storage medium according to claim 1, wherein
the additional information includes subtitles information,
in accordance with the subtitle information, the subtitles are displayed in the contents display screen area in synchronicity with a video of the video contents, and
the motion of the object is controlled so as to move in conjunction with the subtitles displayed in the contents display screen area.

13. The non-transitory computer readable storage medium according to claim 12, wherein:
the additional information includes the subtitles information;
the subtitles information includes information which represents timing of respective pieces of text to be displayed on a screen;
the motion control information specifies the motion of the object corresponding to a keyword; and
the video contents display program causes the computer to further execute determining, with reference to the subtitles information and the motion control information, whether or not the keyword is included in, among the subtitles, subtitles corresponding to a scene currently displayed in the contents display screen area, and causing the object to perform a motion corresponding to the keyword when the keyword is included in the subtitles corresponding to the scene.

14. A video contents display apparatus for displaying video contents,
the video contents having additional information relating to the video contents added thereto, and
the video contents display apparatus comprising:
a contents display control unit for displaying the video contents in a contents display screen area;
a virtual space display control unit for displaying, in a virtual space display screen area, a two-dimensional or a three-dimensional virtual space and an object appearing in the two-dimensional or the three-dimensional virtual space, the virtual space display screen area being a different display screen area from the contents display screen area; and
a motion control unit for controlling, when the video contents are displayed in the contents display screen area, a motion of the object such that the object moves based on the video contents by using the additional information of the video contents and motion control information which specifies the motion of the object when the additional information satisfies a predetermined condition.

15. A video contents display system for displaying video contents, the video contents having additional information relating to the video contents added thereto, and the video contents display system comprising:
a contents display device having a contents display screen area;
a virtual space display device having a virtual space display screen area; and
a processing system configured to:
display video contents in the contents display screen area, the video contents having additional information relating to the video contents added thereto,
display, in the virtual space display screen area, a two-dimensional or a three-dimensional virtual space and an object appearing in the two-dimensional or the three-dimensional virtual space, the virtual space display screen area being a different display screen area from the contents display screen area, and
control, when the video contents are displayed in the contents display screen area, a motion of the object such that the object moves based on the video contents by using the additional information of the video contents and motion control information which specifies the motion of the object when the additional information satisfies a predetermined condition.

16. A method for controlling a motion of an object, comprising:
displaying video contents in a contents display screen area, the video contents having additional information relating to the video contents added thereto;
displaying, in a virtual space display screen area, a two-dimensional or a three-dimensional virtual space and an object appearing in the two-dimensional or the three-dimensional virtual space, the virtual space display screen area being a different display screen area from the contents display screen area; and
controlling, when the video contents are displayed in the contents display screen area, a motion of the object such that the object moves based on the video contents by using the additional information of the video contents and motion control information which specifies the motion of the object when the additional information satisfies a predetermined condition.

* * * * *